United States Patent
Rowe

(10) Patent No.: US 11,499,404 B2
(45) Date of Patent: Nov. 15, 2022

(54) PROCESS HEATER FOR WATER BASED FLUID

(71) Applicant: Halliburton Energy Services, Inc., Houston, TX (US)

(72) Inventor: Mathew Dennis Rowe, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 56 days.

(21) Appl. No.: 17/110,044

(22) Filed: Dec. 2, 2020

(65) Prior Publication Data

US 2021/0285310 A1  Sep. 16, 2021

Related U.S. Application Data

(60) Provisional application No. 62/987,666, filed on Mar. 10, 2020.

(51) Int. Cl.
| | | |
|---|---|---|
| *E21B 36/04* | (2006.01) | |
| *E21B 43/24* | (2006.01) | |
| *C09D 5/16* | (2006.01) | |
| *C09D 183/00* | (2006.01) | |
| *E21B 4/02* | (2006.01) | |

(52) U.S. Cl.
CPC ........ *E21B 43/2401* (2013.01); *C09D 5/1681* (2013.01); *C09D 183/00* (2013.01); *E21B 4/02* (2013.01); *E21B 36/04* (2013.01)

(58) Field of Classification Search
CPC ....... E21B 36/04; E21B 43/24; E21B 43/2401
See application file for complete search history.

(56) References Cited

U.S. PATENT DOCUMENTS

| 10,113,067 | B2 | 10/2018 | Koene et al. |
|---|---|---|---|
| 2010/0089579 | A1 | 4/2010 | Reyes et al. |
| 2016/0369606 | A1 | 12/2016 | Chong et al. |
| 2019/0060834 | A1 | 2/2019 | Katz |

FOREIGN PATENT DOCUMENTS

| EP | 3061903 A1 | 8/2016 |
|---|---|---|
| EP | 3055371 B1 | 1/2018 |

OTHER PUBLICATIONS

Foreign Communication from Related Application—International Search Report and Written Opinion of the International Searching Authority, International Application No. PCT/US2020/063127, dated Mar. 10, 2021, 11 pages.

Filing Receipt, Specification and Drawings for U.S. Appl. No. 62/987,666, entitled "Process Heater for Water Based Fluid," filed Mar. 10, 2020, 64 pages.

*Primary Examiner* — Giovanna Wright
(74) *Attorney, Agent, or Firm* — Conley Rose, P.C.; Rodney B. Carroll

(57) ABSTRACT

A gas extraction system comprising a heater configured to receive a wellbore servicing fluid sample and discharge a heated wellbore servicing fluid sample, wherein the heater comprises an internal heat exchange surface coated with a superhydrophobic coating composition; a gas extractor configured to receive at least a portion of the heated wellbore servicing fluid sample and extract an extracted gas from the heated wellbore servicing fluid sample; and one or more detectors configured to receive at least a portion of the extracted gas and provide an analysis of the extracted gas.

20 Claims, 14 Drawing Sheets

PROCESS HEATER FOR WATER BASED FLUID

CROSS-REFERENCE TO RELATED APPLICATIONS

This application claims priority under 35 U.S.C. § 119(e) to U.S. Provisional Patent Application No. 62/987,666 filed on Mar. 10, 2020 and entitled "Process Heater for Water Based Fluid," the disclosure of which is hereby incorporated herein by reference in its entirety.

TECHNICAL FIELD

The present disclosure relates generally to heaters used to heat a wellbore servicing fluid such as a water based drilling fluid.

BACKGROUND

Wellbores are drilled from the earth's surface into a subterranean formation for the recovery of natural resources such as oil and gas. A wellbore is drilled by rotating a drill bit extending from the surface into the wellbore via a string of drill pipe. During drilling operations, a drilling fluid (also referred to drilling mud) is circulated down the interior of the drill pipe, out the drill bit, and back up the annulus between the drill pipe and wellbore wall, which aids in lubricating the drill bit and removing drill cuttings from the wellbore. For example, drilling fluids can be water based fluids (e.g., water based mud). Upon return to the surface, the drilling fluid can be further treated, for example to remove the drill cuttings and/or entrained oil and gas from the drilling fluid. Entrained oil and gas recovered from the drilling fluid can be further analyzed to aid in assessing the subterranean formation and controlling (e.g., steering) drilling operations to improve oil and gas recovery.

BRIEF SUMMARY OF THE DRAWINGS

For a more complete understanding of this disclosure, reference is now made to the following brief description, taken in connection with the accompanying drawings and detailed description, wherein like reference numerals represent like parts.

DETAILED DESCRIPTION

During wellbore drilling operations, a drilling fluid (e.g., a water based mud or WBM) can be circulated (e.g., pumped) from a drilling rig located at the earth's surface downhole through a string of drill pipe supported by the drilling rig. The drilling fluid exits the drill pipe via a drill bit located at the end of the drill pipe and flows back uphole to the surface via an annular space located between the drill pipe and the wellbore wall. Upon return to the surface, hydrocarbons (e.g., gas) can be extracted from the circulated, recovered drilling fluid and further analyzed (also referred to as formation fluid characterization), which can be used to aid in assessing the subterranean formation and controlling (e.g., steering) drilling operations to improve oil and gas recovery and maximize asset value.

Figure 1A:
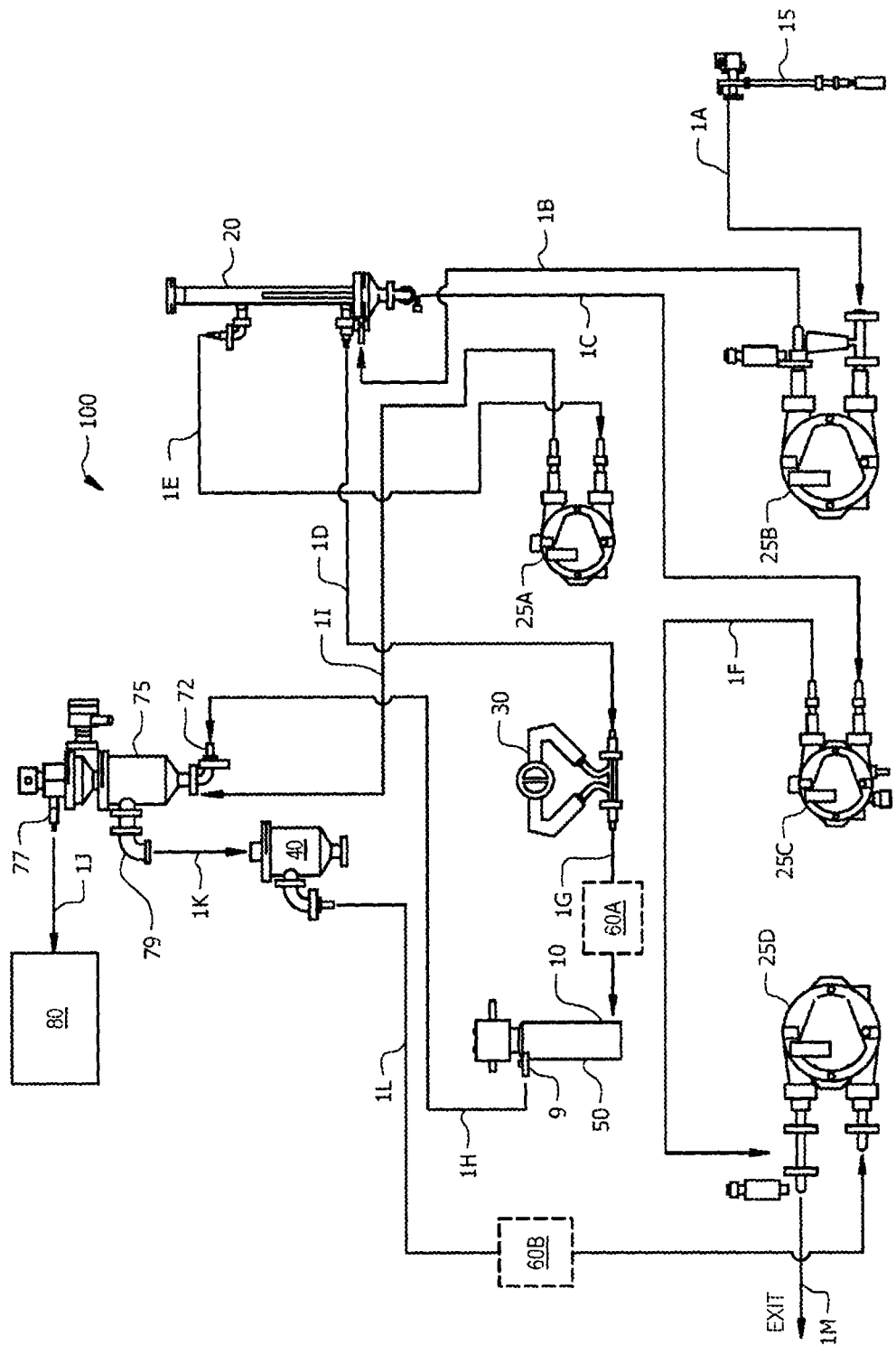
FIG. 1A is a schematic of a gas extraction system, according to embodiments of this disclosure.

Referring to FIG. 1A, which is a schematic of a gas extraction system 100, according to embodiments of this disclosure, a gas extraction system 100 can be used to extract gas from the circulated, recovered drilling fluid (e.g., water based mud) returned to the surface, for example the EAGLE™ gas extraction system available from Halliburton Sperry Drilling, and the extracted gas can be subjected to a variety of analytical techniques (e.g., detectors) such as gas chromatography, mass spectrometry, isotopic analysis, total hydrocarbon analysis, or combinations thereof. The data obtained from the detectors can be subjected to further geochemical analysis, for example using tools such as Gas Analysis Studio™ software available from Halliburton Sperry Drilling, for formation fluid characterization (e.g., identification, quantification) and further reservoir insight (e.g., hydrocarbon extraction efficiency, porosity, permeability, compartmentalization, etc.). The process of extracting and analyzing hydrocarbons (e.g., gas) from drilling fluid that has been circulated from the surface, downhole, and returned back to the surface and recovered from the wellbore can also be referred to as surface data logging (SDL), surface mud logging, surface data logging-while-drilling (LWD), surface mud logging-while-drilling (LWD), and the like.

Upon return to the surface, the recovered drilling fluid can be sampled (for example via suction tube assembly 15 in fluid communication with a source of drilling fluid such as a flow line), and the drilling fluid sample fed to gas extraction system 100 configured to extract gas from the drilling fluid sample. The sampling and related drilling fluid sample can be continuous (e.g., a continuous sampling slipstream in fluid communication with a recovered drilling fluid flow conduit or pit) or discrete (e.g., a plurality of intermittent drilling fluid samples obtained at time intervals from a recovered drilling fluid flow conduit or pit). The drilling fluid sample can be conveyed from the sampling device/location (e.g., suction tube assembly 15) to a separation device 20 (e.g., dampener, deaerator, separator (DDS)). A flow line 1A can be utilized to carry the drilling fluid sample from sampling device 15 to delivery pump 25B, which delivery pump can pump the drilling fluid sample into separator 20 via flow line 1B. Within separator 20, the drilling fluid is separated into solid, liquid, and gas components thereof (and related flow lines). For example, a solids flow line 1C can fluidly connect a solids outlet of separator 20 with solids pump 25C, which can pump the solids separated in separator 20 to exit line 1M via solids flow line 1F; a liquid flow line 1D can carry liquids separated in separator 20 into heater 50, for example, via flow rate sensor 30 (e.g., Coriolis flow meter) and liquid flow line 1G; a gas flow line 1E can be utilized to transport gas from separator 20 to de-aerator pump 25A, and a flow line 1I can fluidly connect de-aerator pump 25A with gas extractor or separator 75, as shown in FIG. 1A.

The liquid component of the drilling fluid can thus be conveyed to a heater 50 where it is heated and then conveyed (e.g., via flow line 1H) to a gas extractor 75 as described herein. The gas extraction system 100 can comprise a gas extractor or degasser (e.g., a hermetic degassing chamber) 75 having a sample inlet 72, an extracted gas outlet 77, and a spent sample outlet 79. The gas extraction system 100 can further comprise a heater 50 upstream of and in fluid communication with the gas extractor sample inlet 72. The heater 50 can have a heater sample inlet 10 and a heater outlet 9 for conveying a heated sample to the gas extractor 75. The heater 50 can be used to heat the sample prior to gas extraction, for example to provide a constant-temperature condition for gas extraction (e.g., a constant degassing temperature) from the sample to aid in obtaining consistent gas extraction results and related analysis/measurements. Additionally or alternatively, in environments where mud returns are cooled (e.g., deepwater wells), the heater 50 can be used to heat the sample to aid extraction of heavy hydrocarbons (e.g., C6+) therefrom. The extracted gas can be fed from extracted gas outlet 77, and one or more flow lines 1J, to one or more detectors 80 (e.g., a gas chromatograph, a mass spectrometer, an isotopic analyzer, a total hydrocarbon analyzer, or combinations thereof) in fluid communication with the extracted gas outlet 77 of the gas extractor 75. The gas extraction system 100 can further comprise one or more pumps 25 (e.g., de-aerator pump 25A, delivery pump 25B, solids pump 25C, return pump 25D), valves, flow lines, sensors (e.g., density senor, flow rate sensor 30 such as a Coriolis flow meter, temperature sensor, etc.), controllers, computers, data transmission lines, and the like coupled together (e.g., in fluid and/or electrical communication) and configured to control transport and analysis of the sample via heater 50, gas extractor 75, and extracted gas detector(s) 80 and to dispose of any products remaining after the gas extraction and related analysis. Spent sample can be introduced, for example via flow line 1K, into liquid trap 40. Fluid from liquid trap 40 can be pumped, for example via return pump 25D, from flow line 1L to exit flow line 1M.

Figure 1B:
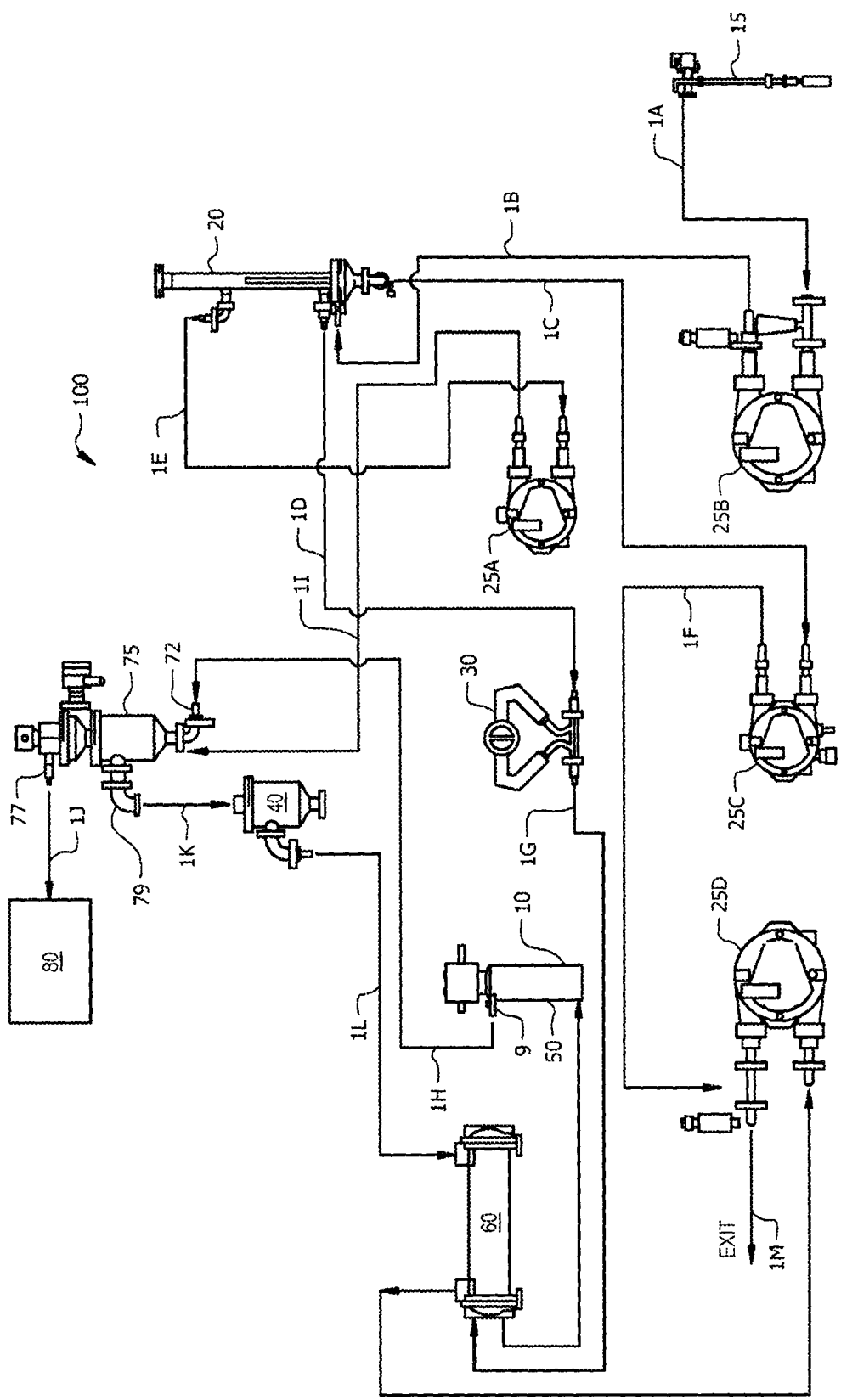
FIG. 1B is a schematic of a gas extraction system, according to embodiments of this disclosure.

In embodiments, gas extraction system 100 can further comprise one or more heat exchangers 60. For example, gas extraction system 100 of FIG. 1A can comprise a heat exchanger 60A positioned on the cold side of heater 50, for example between flow rate sensor 30 (e.g., Coriolis flow meter) and heater 50 and/or a heat exchanger 60B positioned on the hot side of heater 50 (e.g., between liquid trap 40 and return pump 25D). In embodiments, a single heat exchanger 60 can be utilized to provide the heat exchange. For example, FIG. 1B is a schematic of a gas extraction system 100A, according to embodiments of this disclosure. Gas extraction system 100A comprises heat exchanger 60 configured such that, within heat exchanger 60, heat exchange occurs between fluid in flow line 1L and fluid in flow line 1G, heating the fluid in flow line 1G and concomitantly cooling the fluid in flow line 1L.

Figure 3:
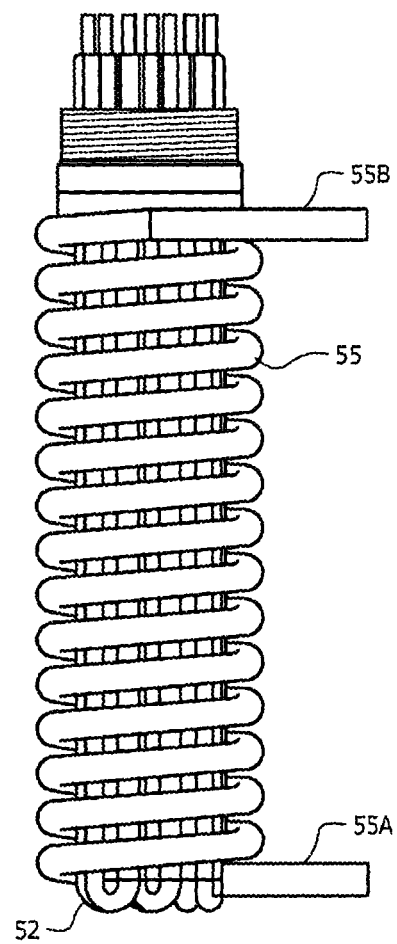
FIG. 3 is a schematic of a heat exchange surface of a heater suitable for use in a gas extraction system, such as the gas extraction system of FIG. 1A or FIG. 1B, according to embodiments of this disclosure.

The heater 50 can be any suitable heater capable of heating the drilling fluid sample to a desired temperature, for example a shell and tube heat exchanger, a direct fired heater, or an electrical heater. FIG. 3 is a schematic of a heat exchange surface of a heater suitable for use in a gas extraction system, such as the gas extraction system of FIG. 1A or FIG. 1B, according to embodiments of this disclosure. The heater 50 is configured for receiving via heater sample inlet 10 a drilling fluid sample stream having a fluid sample flow rate (e.g., as measured by flow rate sensor (e.g., flow meter) 30), contacting the drilling fluid sample stream with one or more heat exchange surfaces 55 (FIG. 3) disposed within a housing 51 of the heater 50, and discharging a heated drilling fluid sample via the heater outlet 9. The heater 50 can comprise a heat exchange surface 55 having a drilling fluid contact face and a heating medium contact face, wherein the drilling fluid sample contacts the drilling fluid contact face and receives heat (i.e., is heated thereby) and the heating medium contacts heating medium contact face and conveys heat (i.e., is cooled thereby). The heat exchange surface 55 may be heated via contact with a heating medium such as steam or combustion gases in a fired heater 50. Alternatively, the heat exchange surface 55 may be heated by an electrical heat source, for example directly via resistance heat generated by current flow through the heat exchange surface 55 or indirectly heating of the heat exchange surface via one or more heating coils, wires, etc., in contact with the heat exchange surface 55, via contact of the heat exchange surface 55 with a heating medium (e.g. oil) that has been electrically headed, or radiant (e.g., infrared) heating of the heat exchange surface 55.

Figure 2A:
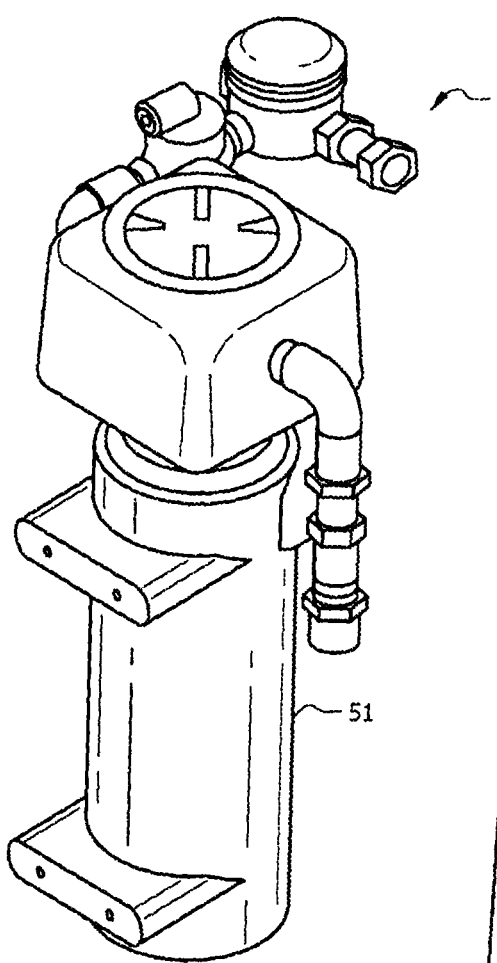
FIG. 2A is an isometic view of a heater suitable for use in a gas extraction system, such as the gas extraction system of FIG. 1A, according to embodiments of this disclosure.
Figure 2B:
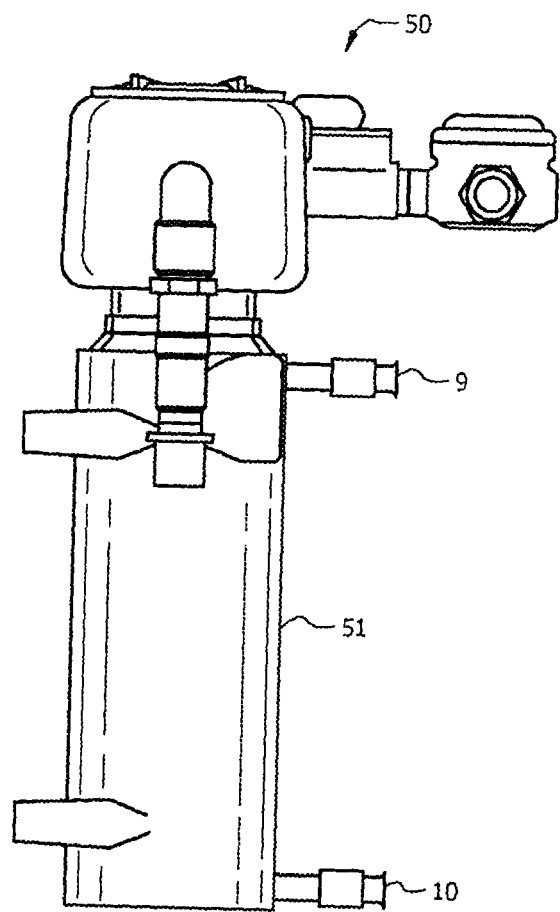
FIG. 2B is a right side view of the heater of FIG. 2A.

FIG. 2A is an isometric view of a heater suitable for use in gas extraction system 100, according to embodiments of this disclosure; FIG. 2B is a right side view of the heater of FIG. 2A. In embodiments, the heater 50 is an electrical heater of the type shown in FIGS. 2A-2B which comprises a stainless steel coiled tubing that provides heat exchange surface 55 inside the heater housing 51, the coiled tubing having a first end 55A coupled to heater sample inlet 10 and a second end 55B coupled to heater outlet 9. Fluid (e.g., a drilling fluid sample) may enter the heater 50 via heater sample inlet 10, flow through the heater 50 via a flow path provided by the heat exchange surface 55 (e.g., continuous stainless steel coiled tubing), and exit heater 50 via heater outlet 9, wherein the fluid is heated as it passes through heater 50 from the heater sample inlet 10 to the heater outlet 9. Accordingly, the interior surface of the heat exchange surface 55 (e.g., stainless steel coiled tubing) within heater housing 51 serves as an internal heat exchange surface 55 that can be coated with a superhydrophobic coating composition as described herein. As depicted in FIG. 2A and FIG. 2B, heater 50 can be heated by a plurality (e.g., 2, 3, 4, 5, etc.) of electrical resistance heating coils 52 disposed within the housing 51 adjacent to an exterior surface of the heat exchange surface 55 (e.g., stainless steel coiled tubing). The exterior housing 51 of the heater 50 can be insulated, for example with a thermal blanket.

The drilling fluid sample can be heated to a temperature of equal to or greater than 25, 30, 35, 40, 45, 50, 55, 60, 65, 70, 75, or 80° C. In embodiments, the heater 50 has a drilling fluid sample flow rate of equal to or greater than 1, 2, 3, 4, 5, 6, 7, 8, 9 or 10 liters per minute. In embodiments, the drilling fluid is a water based drilling fluid and the sample can be heated to a temperature of equal to or greater than 25, 30, 35, 40, 45, 50, 55, or 60° C. and the heater 50 has a flow rate of 2 to 5 liters per minute, alternatively 2 to 4 liters per minute, or alternatively 3 liters per minute.

The drilling fluid can be a water based drilling fluid, a non-water based drilling fluid (e.g., diesel oil, mineral oil, synthetic fluid), or an emulsion. In embodiments, the drilling fluid comprises a water based drilling fluid as the term is understood to a person of ordinary skill in the wellbore drilling arts. In embodiments, the drilling fluid is a water based drilling fluid wherein water (or saltwater) is the majority liquid phase (e.g., greater than 50 weight percent (wt %)) as well as the wetting (external) phase (e.g., the phase wetting solid surfaces such as drill cuttings). In embodiments, the sampled drilling fluid comprises a water based drilling fluid comprising water, clay, a polymer emulsifier, and one or more viscosifiers.

In order to prevent scaling, caking, precipitation, or solids buildup within the heater 50, for example when heating water based drilling fluids (e.g., having a polymer emulsifier and one or more viscosifiers), one or more internal surfaces of the heater 50 (e.g., one or more drilling fluid contact faces of heat exchange surface 55 (e.g., an interior surface of a coiled tubing heat exchange surface 55) disposed within the heater housing 51) can be coated with a coating composition effective to prevent solids build up on the coated surface during heating of the drilling fluid sample (e.g., water based drilling fluid sample). In embodiments, the coating is a superhydrophobic or ultrahydrophobic coating composition, is resistant to abrasive material, is temperature tolerant to 180 degrees Celsius (° C.), does not generate any detectable artificial gas component that would interfere with hydrocarbon readings in the detectors 80, and does not allow material to stick to the internal coated heater surface after shut down of the gas extraction system 100. A suitable superhydrophobic or ultrahydrophobic coating is extremely difficult to wet and the contact angles of a water droplet on the superhydrophobic or ultrahydrophobic material are equal to or greater than 140 degrees (°), 145°, or 150°. The contact angle is the angle, conventionally measured through the liquid, where a liquid-vapor interface meets a solid surface, and the contact angle quantifies the wettability of a solid surface by a liquid via the Young Equation (1).

$$Y_{SG} = Y_{SL} + Y_{LG} \cos \theta \qquad (1),$$

wherein $Y_{SG}$ is solid-gas surface tension, $Y_{SL}$ is solid-liquid surface tension, $Y_{LG}$ is liquid-gas surface tension, and $\theta$ is the contact angle. A suitable superhydrophobic or ultrahydrophobic coating can display the lotus effect, wherein a droplet striking a coated surface fully rebounds like an elastic ball.

In embodiments, the coating composition comprises a hydrophobic sol-gel material. In embodiments, the coating composition comprises a sol-gel material formed by combining two parts: A first Part A comprising 2-propanol, polyurethane silane, tetraethoxysilane, and acetylacetone; and a second Part B comprising 2-propanol, 1-propanol, and water. In embodiments, the coating composition comprises a hydrophobic sol-gel solid material (e.g., 10 to 30 wt % solids, alternatively 10 to 25 wt % solids, alternatively 15 to 25 wt % solids, or alternatively 15 to 20 wt % solids) in solvent (e.g., alcohol and water).

In embodiments, the coating composition comprises a polymeric sol-gel coating formed by the contacting of (i) one or more silane-containing compounds, and (ii) one or more solvents. In embodiments, the polymeric sol-gel coating is a liquid-silicate-based material with a solids content of equal to or greater than approximately 90% based on the total weight of the coating. In embodiments the silane-containing compound comprises polyurethane silane, tetraethoxysilane, methyltriethoxysilane, dimethyldiethoxysilane, phenyltriethoxysilane, diphenyldiethoxysilane, phenyltrimethoxysilane, 3-glycidoxypropyltrimethoxisilane, 3-glycidoxypropyldimethoxyethoxysilane, aminopropylmethyldimethosilane, aminopropyltrimethoxysilane, gamma mercaptopropyltrimethoxysilane, vinyltrimethoxysilane, or combinations thereof. In embodiments, the silane-containing compound further comprises polymeric material, such as a polyurethane (PU) or a polyacrylic. In embodiments, the solvent comprises denatured ethanol, anhydrous ethanol, methanol, normal propanol, isopropanol, butanol, diethylene glycol, acetones, methylethylketones, tryethyleneglycols, vinylpyrrolidones, toluene, glycerine, phenol, acetylacetone, benzyl alcohol, dioxane, or combinations thereof. In embodiments, the solvent includes water.

The coating composition can generally be an acid catalyzed condensation reaction product comprised of an organic polymeric silane, an inorganic metal alkoxide and a fluorinated silane.

The organic polymeric silane component of the coating composition can include either a polyol (including but not limited to dials, trials, tetraols, pentols, and the like) which is silane functionalized with a metal alkoxide (e.g., an isocyanate terminated silane) through a urethane linkage or a polyamine which is silane functionalized with a metal alkoxide through a urea linkage. The reaction between the polyol and the isocyanate-terminated silane may be catalyzed using a tin catalyst such as dibutyltindilaurate. Other polyols, such as those derived from polyester, polyether, polycarbonate, and the like may also be used.

In embodiments, the polyol or polyamine is silane-functionalized with isocyanatopropyltrimethoxysilane or isocyanatopropyltriethoxysilane through urethane or urea linkages, respectively.

The polyurethane silane can be produced from a wide range of molecular, oligomeric, or polymeric polyether or polyester based polyols possessing at least 2 hydroxyls, alternatively, 3 or 4 hydroxyls. Polyols with molecular weights between 50 and 10,000 g/mol may be used, e.g., polyols with molecular weights in a range of from 1000 to 2000 g/mol. For example, CAPA™ brand polyester polyols available commercially from Perstorp Corporation, or ARCOL® brand polyether based polyols commercially available from Bayer Material Science may be utilized.

Representative polyester and polyether polyols include polycaprolactone diols or triols, polyethyleneoxide diols or triols, polypropylene diols and triols with weight average molecular weights within the ranges noted above may satisfactorily be employed. In embodiments, a polycaprolactone triol with the structure (I):

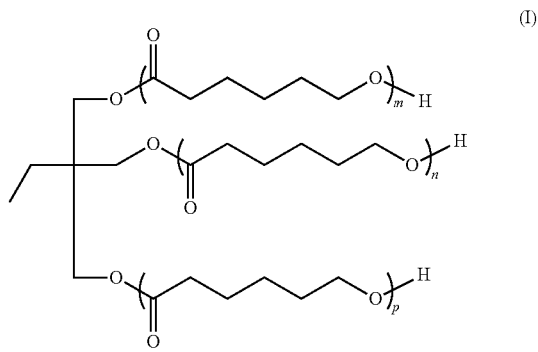

(I)

where m+n+p=7 to 16 may be used.

Polyamines can alternatively be used in the same manner with reaction of the isocyanate-terminated silane through a urea linkage. The polyurea silane can be produced from a wide range of molecular, oligomeric, or polymeric polyamines possessing at least 2 primary or secondary amine groups, for example, 3 or 4 amines per molecule. Polyamines with molecular weights between 50 and 10,000 g/mol may be used, e.g., 100-1000 g/mol. For example, diethylenetriamine or JEFFAMINE® amines commercially available from Huntsman Petrochemical Corporation, such as JEFFAMINE® T-403 polyether amine may be employed satisfactorily.

By the term, "polyamine" as used herein, it is meant any aliphatic or aromatic compound containing two or more primary or secondary amine functional groups. The polyamine compound may have any suitable backbone chain structure including saturated or unsaturated, and linear branched, or cyclic. Representative polyamines include polyetheramines such as diamines with the structure (II):

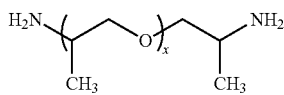

(II)

where x is in a range of from 2 to 70, e.g., x is from 2 to 7.

Alternatively the polyetheramine is a triamine with the structure (III):

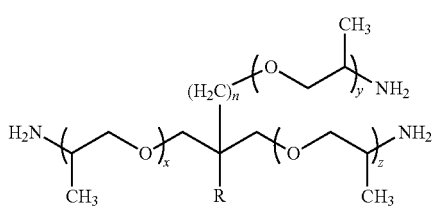

(III)

where n is in a range of from 0 to 5, and x+y+z is in the range if from 3 to 100. In embodiments, n=1 and x+y+z is in the range of 5 to 6.

The inorganic metal alkoxide component of the coating material comprises at least one metal alkoxide, such as those based on Si, Al, Ti, Zr, and the like. In embodiments, the inorganic metal alkoxide component is selected from silicon alkoxides. The silicon alkoxides may also comprise monofunctional organic moieties such as epoxide, alkyl, phenyl, vinyl, mercapto, methacrylate, and the like, or be bis-silane terminated, such as bis-trimethoxysilylethane.

The preferred metal alkoxide comprises at least one hydrolyzable compound having at least one silane group, $Si(R^1)_xR^2)_{4-x}$, per molecule, wherein $R^1$ represents an alkyl group (for example a C1-C8, polymerizable group (e.g. epoxide, vinyl, acrylic), or other alkyls terminated with another organic moiety (hydroxyl, isocyanate, amino, thiol, etc.), $R^2$ represents a hydrolyzable group (for example an alkoxy or halide group, preferably methoxy, ethoxy or chloro) and x is 0, 1, 2, 3. In embodiments, the metal alkoxide is tetraethoxysilane or tetramethoxysilane.

Representative examples of fluorinated silane compounds include those having the formula $RflSi(R^1)_x(R^2)^{3-x}$ where Rfl represents a fully or partially perfluorinated segment (e.g., a 3,3,3-trifluoropropyl, (perfluorobutyl)ethyl, (perfluorohexyl)ethyl, (perfluorooctyl)ethyl, perfluorododecyl, perfluorotetradecyl, heptadecafluoro-1,1,2,2-tetrahydrodecyl, nonafluorohexyl or tridecafluoro-1,1,2,2-tetrahydrooctyl), $R^1$ represents an alkyl group (for example a C1-C8, e.g., C1-C4 primary or secondary alkyl group) and $R^2$ represents a hydrolyzable group (for example an alkoxy or halide group, preferably methoxy, ethoxy or chloro) and x is 0, 1, or 2.

In embodiments, fluorinated silane compounds according to formula $Rf^2[Q-C(R)_2—Si(R^1)_x(R^2)_{3-x}]_z$ are used wherein $Rf^2$ represents a multivalent poly(perfluorooxyalkyl) or poly(perfluoroxyalkylene) segments, Q represents an organic divalent linking group (examples include amide, ether, ester or urethane linking group), R1 represents an alkyl group (for example a C1-C8, e.g., C1-C4 primary or secondary alkyl group) and R2 represents a hydrolyzable group and is 0, 1, or 2; R represents hydrogen or an alkyl group of 1 to 4 carbon atoms and the R groups may be the same or different. In embodiments, R is hydrogen.

The hydrolyzable groups $R^2$ may be the same or different and are generally capable of hydrolyzing under appropriate conditions, for example under acidic aqueous conditions, such that the fluorochemical silane compound can then undergo condensation reactions. Preferably, the hydrolysable groups upon hydrolysis yield groups capable of undergoing condensation reactions, such as silanol groups.

Certain embodiments will employ a fluorinated silane component which comprises either a bis-silane terminated polyfluoropolyether or a fluoro-terminated silane, such as (3,3,3-trifluoropropyl)trimethoxysilane, nonafluorohexyltrimethoxysilane, and the like.

Metal oxide particles may optionally be used in the coating formulation to impart desired properties, such as abrasion resistance, electrical or optical properties. For example, metal oxide particles of silica, titania, zirconia, and/or alumina may be used. In embodiments, silica ($SiO_2$) is employed. For optical transparency, it may be preferred that the particles are less than 100 nm, e.g. between 1 nm to 100 nm. In embodiments, the particle size can be in the range of from 1-10 nm diameter spherical nanoparticles. If present, the particles can be included in the formulation up to 50 wt %, preferably between 20 wt % to 30 wt %, based on total formulation weight.

The composition of the formulation can vary depending on the desired final properties for flexibility, hardness, abrasion resistance, transparency, or other desired physical properties. Generally the weight ratio of the polymeric silane to the metal alkoxide or organic functional metal alkoxide in the formulation may be between 1:10 to 10:1, e.g., 3:1. The weight percentage of the fluorosilane in the formulation can be in a range of from 0.0001 to 1 wt %, or in a range of from 0.0005 to 0.001 wt %.

The coating materials may be produced by mixing the inorganic and organic components in a suitable solvent, such as isopropanol, with water and an aqueous acid catalyst. The aqueous acid catalyst is added to initiate the hydrolysis of the hydrolyzable silane groups. Exemplary acid catalysts include mineral acid such as hydrochloric acid, sulfuric acid and nitric acid, or an organic acid, such as acetic acid. Sufficient acid catalyst is added to reduce the pH of the reaction mixture to below 5, e.g., a pH of between 2 and 4.

The fluorinated silane component may then be added directly to the solution of inorganic and organic components. Alternatively, the fluoro component may be prehydrolyzed with acidified water in a suitable solvent with or without the aid of a fluoro-functionalized surfactant prior to addition to the coating solution. In embodiments, the coating formulation is produced by hydrolysis and condensation of the organic, inorganic and fluoro silane components, leading to a fluoro-functionalized organic-inorganic network through Si—O—Si bonds.

The thus obtained coating formulation may be mixed in a solvent, or alternatively without a solvent. If utilized, the solvent may be an alcohol (methanol, ethanol, propanol, isopropanol, butanol, or the like) or other water miscible solvents, such as acetone. The concentration of the solids in the formulation will depend on the desired thickness for the end application, or application methods. Typically however, the formulation can have between 5 wt % to 100 wt % solids, with an exemplary solids concentration being between 15 wt % to 25 wt %. A solution of the coating material may be applied to the substrate using any convenient coating method including dip, brush, flow coat, spray, and the like. The curing of the coating can be accomplished at a wide range of temperatures depending upon the desired properties, for example abrasion resistance, flexibility, etc., or thermal limitations for the coated substrate. The coating can, in embodiments, be cured at temperatures ranging from 25° C. to 150° C., e.g., 75° C. The temperature of curing can be modified for compatibility with the substrate.

The thickness of the cured coating can vary, for example, a thickness in the range of from 0.5 micron to 20 microns, or from 1 micron to 5 microns.

The cured hydrophobic coatings as described herein can exhibit optical transparency. Specifically, the cured hydrophobic coatings will exhibit a transparency to visible light of at least 99.5%, preferably at least 100%. The coatings can also exhibit a change in haze to visible light less than 1% and preferable less than 0.1%. The hydrophobic coatings described herein are suitable for coating a variety of substrate materials to provide increased chemical resistance, oil repellency, water repellency, liquid/gas barrier, abrasion resistance, corrosion resistance, and watershed capability to the substrate. Suitable substrates include, but are not limited to, glass, metals (such as, without limitation, aluminum and steel), plastics (such as, without limitation, polycarbonate and acrylic), hardened cement, concrete, or grout, wood and painted surfaces.

In embodiments, the coating composition is GENTOO™ clear hydrophobic coating available from Ultratech International, Inc., wherein the resultant coating has the characteristics set forth in the Table 1 and is formed by combining composition Parts A and B.

TABLE 1

| Exemplary Coating Composition | | | |
|---|---|---|---|
| Product Characteristics: | | | |
| Finish: | Glossy | | |
| Color: | Clear | | |
| Percent Solids: | 15-20% (Part A and Part B combined) | | |
| VOC: | 630 g/L (5.26 lbs/gal)(Part A and Part B combined) | | |
| Typical Properties: | | | |
| Contact Angle: | 110°-115° (50 µL droplet) | | |
| Watershedding Angle: | 5°-10° | | |
| Dry Thickness: | 4-6 microns | | |
| Service Temperature Range: | −50° C.-160° C. (−58° F.-320° F.); Short Term: <200° C. (<392° F.) | | |
| Shelf Life: | One year in original packaging at 24° C. (75° F.) | | |
| PART A: | | | |
| Chemical Name | CAS Number/ EINECS Number/ REACH Reg. Number | % (w/w) | CLP/GHS Classification (1272/2008) |
| 2-Propanol | 67-63-0/200-661-7 | 45-60 | Flam. Liq. 2 (H225), Eye Irrit. 2 (H319), STOT SE 3 (H336) |
| Proprietary Polyurethane Silane | Proprietary/Proprietary | 30-45 | Flam. Liq. 4 (H227), Eye Irrit. 2 (H319), STOT SE 3 (H335), Skin Sens. 1 (H317) |
| Tetraethoxysilane | 78-10-4/201-083-8 | 8-15 | Flam. Liq. 3 (H226), Eye Irrit. 2 (H319), STOT SE 3 (H335), Oral Tox. 4 (H302) |
| Acetylacetone | 123-54-6/204-634-0 | <1 | Flam. Liq. 3 (H226), STOT SE 3 (H335), Skin Sens. 1 (H317), Oral Tox. 4 (H302), Dermal Tox. 3 (H311), Inhalation Tox. 3 (H331) |
| Odor threshold: Not determined | | pH: Not applicable | |
| Melting point/freezing point: Not determined | | Boiling Point: 181.4° F. (83° C.) | |
| Flash point: 54° F. (12° C.) | | Evaporation rate (butyl acetate = 1): Not determined | |
| Flammability (solid, gas): Not applicable | | VOC (Wt./Gal) wet: Not determined | |
| Flammable limits: LEL: 1% | | UEL: 12% | |
| Vapor pressure: Not determined | | Vapor density: Not determined | |
| Relative density: 0.898 | | Solubility(ies): Not determined | |
| Partition coefficient: n-octanol/water: Not determined | | Auto-ignition temperature: 750.2° F. (399° C.) | |
| Decomposition temperature: Not determined | | Viscosity: 3.92 | |
| Explosive Properties: Not applicable | | Oxidizing Properties: Not oxidizing | |

TABLE 1-continued

Exemplary Coating Composition

PART B:

| Chemical Name | CAS Number/ EINECS Number/ REACH Reg. Number | % (w/w) | CLP/GHS Classification (1272/2008) |
|---|---|---|---|
| 2-Propanol | 67-63-0/200-661-7 | 60-65 | Flam. Liq. 2 (H225), Eye Irrit. 2 (H319), STOT SE 3 (H336) |
| 1-Propanol | 71-23-8/200-746-9 | 20-25 | Flam. Liq. 2 (H225), Eye Dam. 1 (H318), STOT SE 3 (H336) |
| Water | 7732-18-5/231-791-1 | 10-15 | Not Hazardous |

Odor threshold: Not determined
Melting point/freezing point: Not determined
Flash point: 54° F. (12° C.)
Flammability (solid, gas): Not applicable
Flammable limits: LEL: 1%
Vapor pressure: Not determined
Relative density: 0.812
Partition coefficient: n-octanol/water: Not determined
Decomposition temperature: Not determined
Explosive Properties: Not applicable
pH: 2.35
Boiling Point: 181.4° F. (83° C.)
Evaporation rate (butyl acetate = 1): Not determined
VOC (Wt./Gal) wet: Not determined
UEL: 14%
Vapor density: Not determined
Solubility(ies): Not determined
Auto-ignition temperature: 750.2° F. (399° C.)
Viscosity: 1.11
Oxidizing Properties: Not oxidizing A heat exchange surface 55 (e.g., an interior or exterior of heat exchange surface 55) of the heater 50 can be coated by (i) preparing the surface to be coated, for example via cleaning with a cleaning agent such as vinegar or isopropyl alcohol; (ii) preparing a superhydrophobic coating composition (e.g., a liquid); (iii) applying the liquid superhydrophobic coating composition to the heat exchange surface 55, for example via spraying, rolling, brushing, pumping, etc.; and (iv) allowing the liquid coating composition to dry to form a solid coating composition, for example by curing (e.g., for a period of time at an elevated temperature). The heat exchange surface 55 can be coated prior to installation within and/or assembly of the heater 50. The heat exchange surface 55 can be coated by disassembly of the heater 50, application of the coating to the heat exchange surface 55, and reassembly of the heater 50. The heat exchange surface 55 can be an internal heat exchange surface 55 (e.g., an interior of heat exchange surface 55, such as an interior of a stainless steel coiled tubing heat exchange surface 55) forming at least part of an internal fluid flow passage through the heater 50 (the flow passage having an inlet and an outlet fluidly connected with heater sample inlet 10 and heater outlet 9, respectively), and the internal heat exchange surface 55 can be coated in situ, for example by flowing a liquid coating composition via the heater sample inlet 10 into all or a portion of the internal fluid flow passage provided by heat exchange surface 55 (e.g., an interior of stainless steel coiled tubing heat exchange surface 55); upon an indication that the liquid coating composition has flowed through the heater 50, allowing (e.g., stop pumping) the liquid coating composition to contact all or a portion of the internal heat exchange surface 55; removing (e.g., resume pumping or use a gravity drain) any excess liquid coating composition via the heater outlet 9; and curing the liquid coating composition to form a solid coating on the internal surfaces (e.g., internal heat exchange surface 55) of the heater 50.

Figure 4:
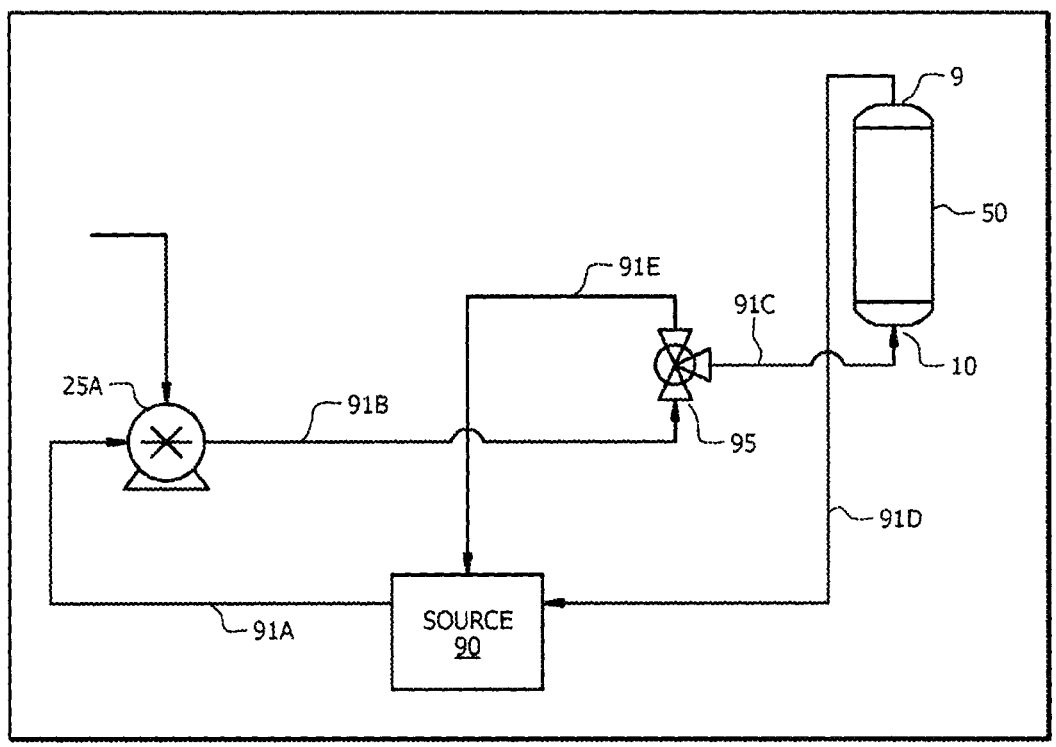
FIG. 4 is a schematic flow diagram of a heater and de-aerator pump of a gas extraction system, such as the gas extraction system of FIG. 1A, configured to flow a liquid coating composition through the heater to coat same, according to embodiments of this disclosure.
Figure 5A:
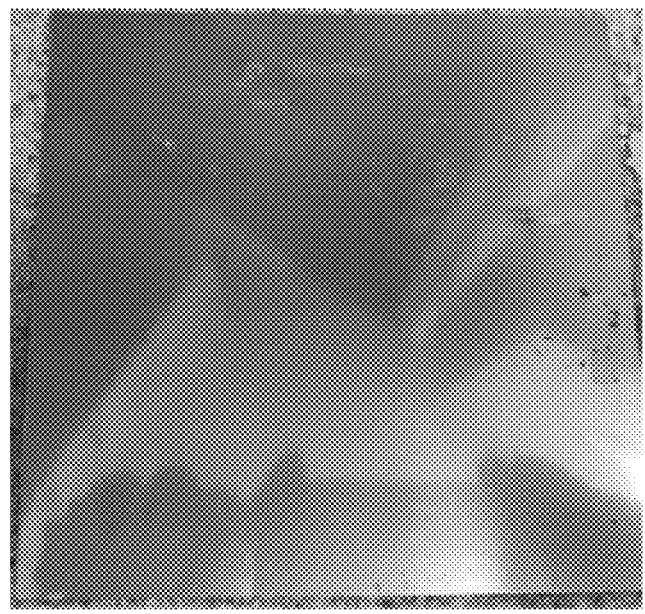
FIGS. 5A-5D are photographs showing the dried mudded polished coupons of Example 3.
Figure 5B:
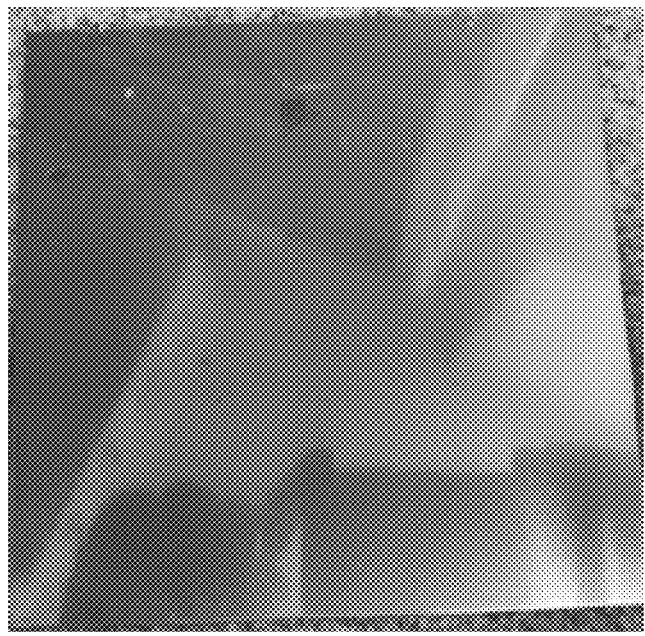
Figure 5C:
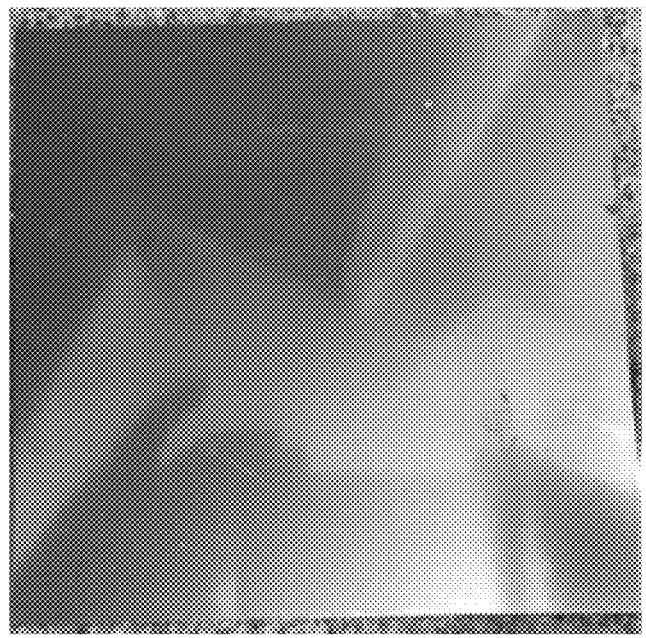
Figure 5D:
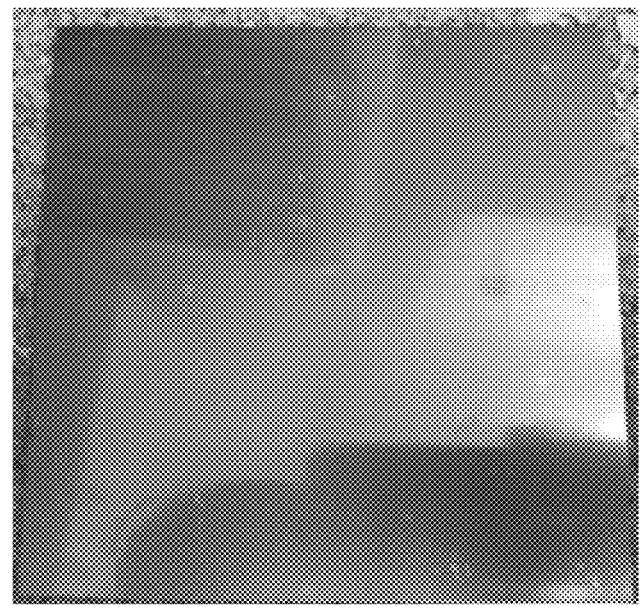
Figure 6A:
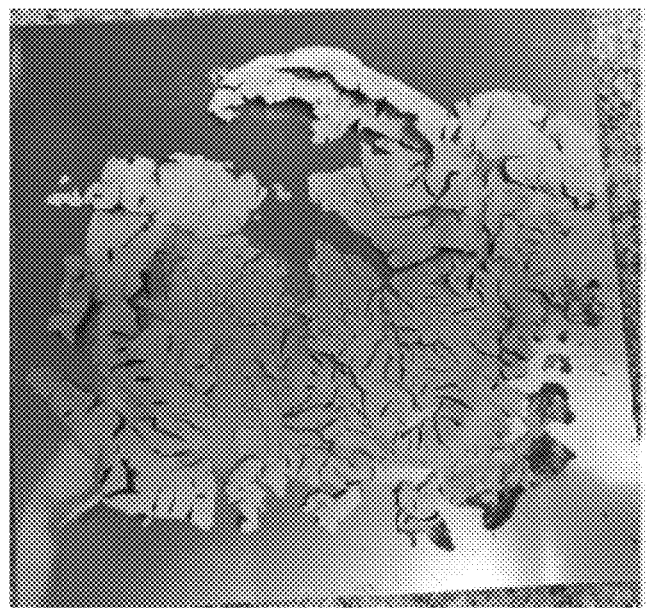
FIGS. 6A-6D are photographs showing the cleaned polished coupons of Example 3 corresponding, respectively, to the dried mudded polished coupons of FIGS. 5A-5D.
Figure 6B:
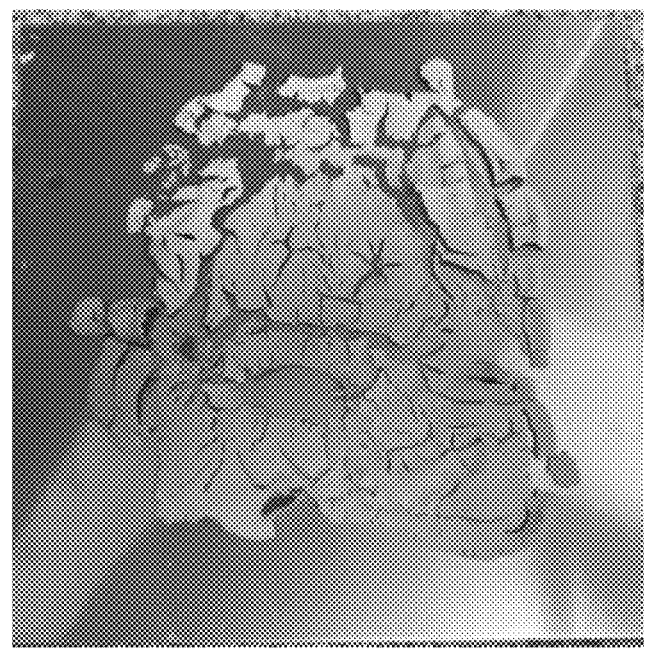
Figure 6C:
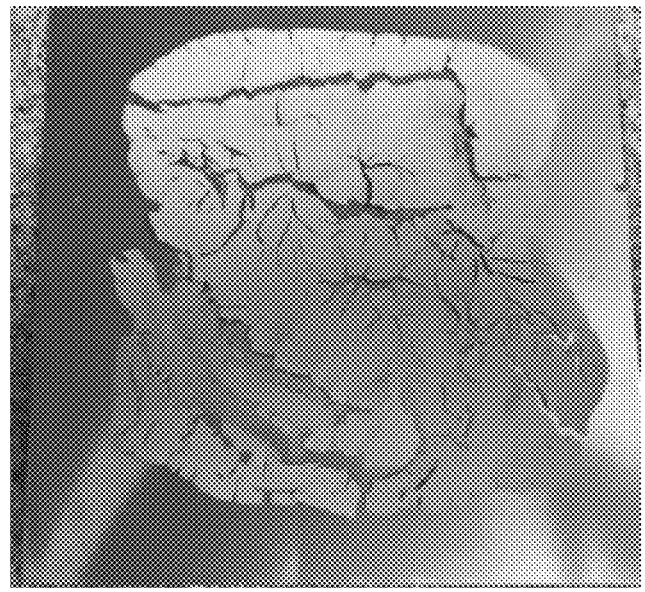
Figure 6D:
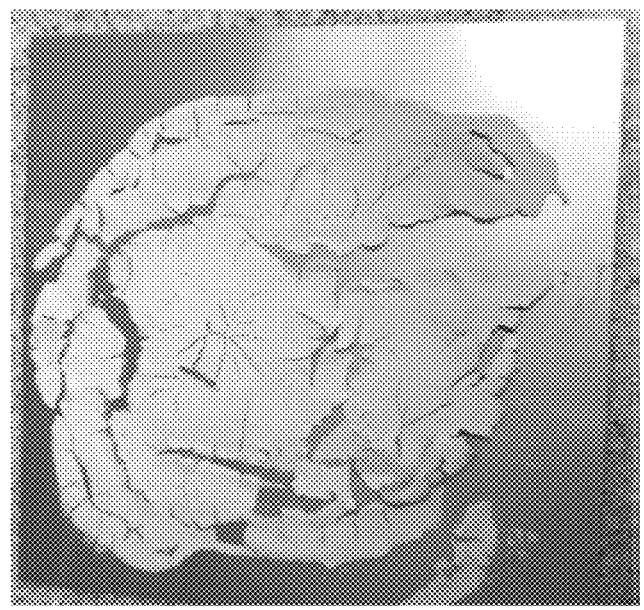

In embodiments, the heater 50 is of a type as shown in FIG. 2A and FIG. 2B having a heater sample inlet 10 for receiving a drilling fluid sample and a heater outlet 9 for discharging a heated drilling fluid sample. The heater 50 may be part of a gas extraction system 100 of the type shown in FIG. 1A, and thus the present disclosure includes a method for retrofitting an existing heater to comprise a superhydrophobic coating of the type disclosed herein. In embodiments, the heater 50 can be cleaned by circulating (e.g., pumping) a cleaning solution (e.g., vinegar solution) through heater sample inlet 10, into contact with an internal heat exchange surface 55, and back out the heater outlet 9. Where the heater 50 is part of a gas extraction system 100 as shown in FIG. 1A, one or more flow lines may need to be disconnected from the heater 50 so that a cleaning fluid can be circulated therein to clean the internal surfaces (e.g., the internal heat exchange surface 55) of the heater 50 prior to coating same. Once a fluid circulation system (e.g., pump 25A, fluid reservoir (e.g., bucket), flow conduits, etc.) is placed in fluid communication with the heater 50, then the fluid circulation system (as shown in FIG. 4) can be used first to clean the heater 50, and subsequently the cleaning fluid can be replaced with a reservoir of a liquid coating composition of the type described herein which can be pumped into the heater 50 to coat in situ the internal surfaces (e.g., the internal heat exchange surface 55) of the heater 50. One or more pumps 25 (e.g., de-aerator pump 25A) of the gas extraction system 100 of FIG. 1 can be repurposed as a circulation pump for purposes of pumping a cleaning fluid and/or liquid coating composition through the heater 50, for example as shown in FIG. 4. FIG. 4 is a schematic flow diagram of a heater and de-aerator pump of a gas extraction system, such as the gas extraction system of FIG. 1A, configured to flow a liquid coating composition through the heater to coat same, according to embodiments of this disclosure. As shown in FIG. 4, de-aerator pump 25A (of FIG. 1A) can be used to pump a liquid coating composition from a source 90 thereof (e.g., bucket) and, via a flow line 91A and flow line 91B, through a 3-way valve 95 and, via a flow line 91C, into heater 50 via (e.g., bottom) heater sample inlet 10, wherein an internal heat exchange surface 55 (e.g., the inside of stainless steel coiled tubing heat exchange surface 55 housed within housing 51 of heater 50 of FIGS. 2A and 2B) is coated with the liquid coating material. Pumping of the liquid coating material can continue until the liquid coating material exits the (e.g., top) heater outlet 9 of the heater 50, where it can be recovered via a flow line 91D back to the source 90 (e.g., bucket), for example via three-way valve 95 and flow line 91E. After the liquid coating is allowed to remain within and in contact with the internal heat exchange surface 55 of heater 50 for a desired curing time, the excess liquid coating can be drained from the heater 50 back to the source 90 thereof (e.g., bucket) via the 3-way valve 95, and flow lines 91C/91E. The coated heat exchange surface 55 can be cured as described herein to yield a solid super hydrophobic coating.

In embodiments, the coated heater 50 is cured by circulating water through the heater 50 while the heater 50 is turned on. For example the curing process can comprise a number of heat and cool cycles. In embodiments, (a) the heater 50 is turned on an allowed to run until reaching a desired elevated temperature (e.g., 190° C.), at which time the heater 50 is turned off and the water is allowed to circulate and cool to a reduced temperature (e.g., 150° C.), at which time (b) the heater 50 is turned on and allowed to run until reaching the or another elevated temperature (e.g., 190° C.), at which time the heater 50 is turned off and the water is allowed to circulate and cool to the or another reduced temperature (e.g., 150° C.), at which time (c) the heater 50 can be turned on an allowed to run until reaching the or another elevated temperature (e.g., 190° C.), at which time the heater 50 can be turned off, the water circulation can be halted and the heater 50 drained, and the coated internal heat exchange surface 55 of the heater 50 can be allowed to sit without fluid contact for a curing time (e.g., greater than or equal to 2, 4, 6, 8, 10, 12, 14, 16, 18, 20, 22, or 24 hours) in order to complete the curing process. After the curing process is completed, the heater 50 may be reconnected into the gas extraction system 100 (e.g., the various fluid flow connections shown in FIG. 1A can be reestablished), and the heater 50 can be returned to service in, for example, surface data logging operations wherein the coated heat exchange surface 55 (e.g., internal coated surface of heat exchange surface 55) of the heater 50 can be contacted with a wellbore servicing fluid (e.g., WBM) to heat the sample and facilitate analysis thereof as described herein.

A heater 50 comprising an internal heat exchange surface 55 coated with a (e.g., superhydrophobic) coating composition as described herein can provide for enhanced run life (e.g., prior to cleaning and/or replacement of the heater 50 or of the heat exchange surface 55). For example, in embodiments, coating the heat exchange surface 55 as described herein can extend the life of the heater 50 by at least 50, 100, 150, 200, 250, or 300% (e.g., between cleanings).

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

The purpose of the example is to characterize the performance of hydrophobic coating material to prevent mud cake buildup on an internal surface of a heater 50 used to heat sample of drilling fluid during gas extraction in a surface data logging operation. The internal heat exchange surface 55 of the heater 50 was represented with a plurality of (e.g., 18) 3 inch×3 inch 316L stainless steel coupons. Nine sample coupons were coated with GENTOO™ coating per the GENTOO™ application instructions and cured as follows: sample set 1a, 1b, and 1c were cured at 120° C.; sample set 2a, 2b, and 2c were cured at 150° C.; and sample set 3a, 3b, and 3c were cured at 180° C. Nine control coupons were not coated and cured as follows: control set 1a, 1b, and 1c were cured at 120° C.; control set 2a, 2b, and 2c were cured at 150° C.; and control set 3a, 3b, and 3c were cured at 180° C. A summary of the test procedure in this Example 1 and subsequent Example 2 can be found in Example 5 hereinbelow.

A water based drilling fluid comprising water, a weighting agent (e.g., barite), a clay (e.g., bentonite), and a viscosifier (e.g., xanthan gum) was prepared. Approximately 10 ml of drilling fluid was applied to each sample and control coupon to form mudded coupons, and the mudded coupons were dried in an oven at the indicated drying temperature for 12 hours to form dried mudded coupons. The dried mudded coupons were removed from the oven, and photographs of the dried mudded coupons taken. The amount of dried mud weight was determined by weighing the dried mudded coupons and subtracting the known coupon weight (see Table 2.1). The dried mudded coupons were then cleaned by turning the coupons over to allow the dried mud to fall off by gravity. If died mud remained on the coupon post turn over, tap water flowing 0.3 m/s was run over the coupon for approximately 30 seconds. Post cleaning the amount of dried mud retained on the cleaned coupons was by weighing the cleaned coupons and subtracting the known coupon weight (see Table 2.1). The average percent of mud retained on each set of cleaned coupons is summarized in Table 2.2. The approximate percentage of surface area still covered by dried mud post cleaning is set forth in Table 2.3 and summarized by set in Table 2.4.

TABLE 2.1

Weight Results of Example 1

| Sample | Sub Sample | Curing Temperature (° C.) | Drilling Fluid Drying Temperature (° C.) | Dried Mud Weight (g) | Dried Mud Weight Post Cleaning (g) | Percent Retained | Average Percent Retained | StDev | 99% CI |
|---|---|---|---|---|---|---|---|---|---|
| 1 | a | 120 | 150 | 1.61 | 0.00 | 0.00% | | | |
| 1 | b | 120 | 150 | 2.09 | 0.01 | 0.48% | | | |
| 1 | c | 120 | 150 | 1.14 | 0.02 | 1.75% | 0.74% | 0.74% | 4.24% |
| 2 | a | 150 | 150 | 1.97 | 0.01 | 0.51% | | | |
| 2 | b | 150 | 150 | 1.98 | 0.00 | 0.00% | | | |
| 2 | c | 150 | 150 | 1.52 | 0.02 | 1.32% | 0.61% | 0.54% | 3.10% |
| 3 | a | 180 | 150 | 1.32 | 0.04 | 3.03% | | | |
| 3 | b | 180 | 150 | 2.10 | 0.05 | 2.38% | | | |
| 3 | c | 180 | 150 | 2.10 | 0.05 | 2.38% | 2.60% | 0.31% | 1.75% |

TABLE 2.1-continued

Weight Results of Example 1

| Sample | Sub Sample | Curing Temperature (° C.) | Drilling Fluid Drying Temperature (° C.) | Dried Mud Weight (g) | Dried Mud Weight Post Cleaning (g) | Percent Retained | Average Percent Retained | StDev | 99% Cl |
|---|---|---|---|---|---|---|---|---|---|
| 1 Control | a | 120 | 150 | 1.34 | 0.30 | 22.39% | | | |
| 1 Control | b | 120 | 150 | 2.01 | 0.60 | 29.85% | | | |
| 1 Control | c | 120 | 150 | 1.37 | 0.45 | 32.85% | 28.36% | 4.40% | 25.20% |
| 2 Control | a | 150 | 150 | 1.69 | 0.45 | 26.63% | | | |
| 2 Control | b | 150 | 150 | 1.61 | 0.54 | 33.54% | | | |
| 2 Control | c | 150 | 150 | 1.78 | 0.49 | 27.53% | 29.23% | 3.07% | 17.58% |
| 3 Control | a | 180 | 150 | 1.86 | 0.45 | 24.19% | | | |
| 3 Control | b | 180 | 150 | 1.66 | 0.57 | 34.34% | | | |
| 3 Control | c | 180 | 150 | 2.10 | 0.55 | 26.19% | 28.24% | 4.39% | 25.14% |

TABLE 2.2

Summary Weight Results of Example 1

| Curing Temperature(° C.) | Average Percent Retained | StDev | 99% Cl |
|---|---|---|---|
| 120 | 0.74% | 0.74% | 4.24% |
| 150 | 0.61% | 0.54% | 3.10% |
| 180 | 2.60% | 0.31% | 1.75% |
| 120 Control | 28.36% | 4.40% | 25.20% |
| 150 Control | 29.23% | 3.07% | 17.58% |
| 180 Control | 28.24% | 4.39% | 25.14% |

TABLE 2.3

Area Coverage Results of Example 1

| Sample | Sub Sample | Curing Temperature (° C.) | Drilling Fluid Drying Temperature (° C.) | Approximate Area Coverage Post Cleaning |
|---|---|---|---|---|
| 1 | a | 120 | 150 | Not discernable |
| 1 | b | 120 | 150 | Not discernable |
| 1 | c | 120 | 150 | Not discernable |
| 2 | a | 150 | 150 | Not discernable |
| 2 | b | 150 | 150 | Not discernable |
| 2 | c | 150 | 150 | Not discernable |
| 3 | a | 180 | 150 | <5% |
| 3 | b | 180 | 150 | <5% |
| 3 | c | 180 | 150 | <5% |
| 1 Control | a | 120 | 150 | 25% |
| 1 Control | b | 120 | 150 | 30% |
| 1 Control | c | 120 | 150 | 30% |
| 2 Control | a | 150 | 150 | 30% |
| 2 Control | b | 150 | 150 | 25% |
| 2 Control | c | 150 | 150 | 30% |
| 3 Control | a | 180 | 150 | 30% |
| 3 Control | b | 180 | 150 | 20% |
| 3 Control | c | 180 | 150 | 25% |

TABLE 2.4

Summary Area Coverage Results of Example 1

| Curing Temperature (° C.) | Average Approximate Area Coverage Post Cleaning |
|---|---|
| 120 | Not discernable |
| 150 | Not discernable |
| 180 | <5% |
| 120 Control | 28% |
| 150 Control | 28% |
| 180 Control | 25% |

Example 2

After cleaning, the plurality of (e.g., 9) 3 inch×3 inch 316L stainless steel control coupons from Example 1 (referred to as contaminated coupons) were coated with GENTOO™ coating according to GENTOO™ application instructions and cured as follows: sample set 1ca, 1cb, and 1 cc were cured at 120° C.; sample set 2ca, 2cb, and 2cc were cured at 150° C.; and sample set 3ca, 3cb, and 3cc were cured at 180° C.

Approximately 10 ml of the water based drilling fluid of Example 1 was applied to each coated contaminated coupon to form mudded coupons, and the mudded coupons were dried in an oven at the indicated drying temperature for 12 hours to form dried mudded coupons. The dried mudded coupons were removed from the oven and dried mud weight was measured as described in Example 1 (see Table 2.1). The dried mudded coupons were then cleaned as described in Example 1, and the amount of dried mud retained on the cleaned coupons was measured as described in Example 1 (see Table 3.1). The average percent of mud retained on each set of cleaned coupons is summarized in Table 3.2. Photographs comparing the dried mudded coupons and corresponding cleaned coupons for sample sets 3c, 2c, and 1c, respectively, were taken.

TABLE 3.1

Results from Coating Contaminated Samples of Example 2

| Sample | Sub Sample | Curing Temperature (° C.) | Drilling Fluid Drying Temperature (° C.) | Dried Mud Weight (g) | Dried Mud Weight Post Cleaning (g) | Percent Retained | Average Percent Retained | StDev | 99% Cl |
|---|---|---|---|---|---|---|---|---|---|
| 1c | a | 120 | 150 | 1.83 | 0.01 | 0.55% | | | |
| 1c | b | 120 | 150 | 1.45 | 0.01 | 0.69% | | | |
| 1c | c | 120 | 150 | 1.51 | 0.02 | 1.32% | 0.85% | 0.34% | 1.94% |
| 2c | a | 150 | 150 | 2.3 | 0.01 | 0.43% | | | |
| 2c | b | 150 | 150 | 1.54 | 0.01 | 0.65% | | | |
| 2c | c | 150 | 150 | 1.67 | 0.02 | 1.20% | 0.76% | 0.32% | 1.84% |
| 3c | a | 180 | 150 | 1.21 | 0.02 | 1.65% | | | |
| 3c | b | 180 | 150 | 1.96 | 0.03 | 1.53% | | | |
| 3c | c | 180 | 150 | 2 | 0.01 | 0.50% | 1.23% | 0.52% | 2.96% |

TABLE 3.2

Summary Results from Coating Contaminated Samples of Example 2

| Curing Temperature(° C.) | Average Percent Retained | StDev | 99% Cl |
|---|---|---|---|
| 120 | 0.85% | 0.34% | 1.94% |
| 150 | 0.76% | 0.32% | 1.84% |
| 180 | 1.23% | 0.52% | 2.96% |

Example 3

As described in Example 1, a plurality of (e.g., 4) of 3 inch×3 inch polished 316L stainless steel coupons were coated with GENTOO™ coating to form coated polished coupons; were mudded and dried to form dried mudded polished coupons; and were cleaned to form cleaned polished coupons. No weight measurements were taken for this example. Photographs comparing the dried mudded polished coupons are depicted in FIGS. 5A-5D, and corresponding cleaned polished coupons are shown in FIGS. 6A-6D.

Example 4

Figure 7A:
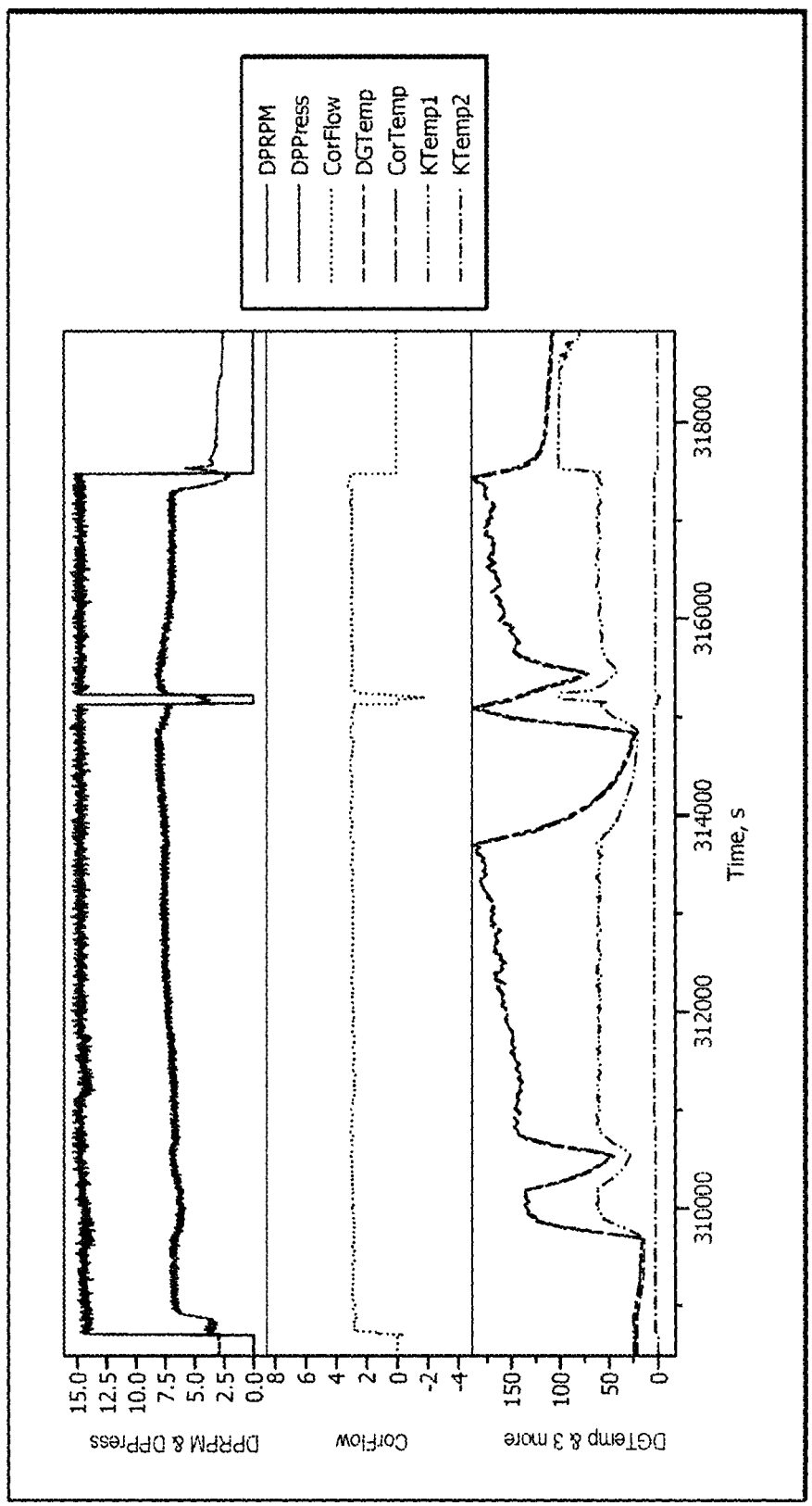
FIG. 7A provides plots showing the results of the Comparative run of Example 4.
Figure 7B:
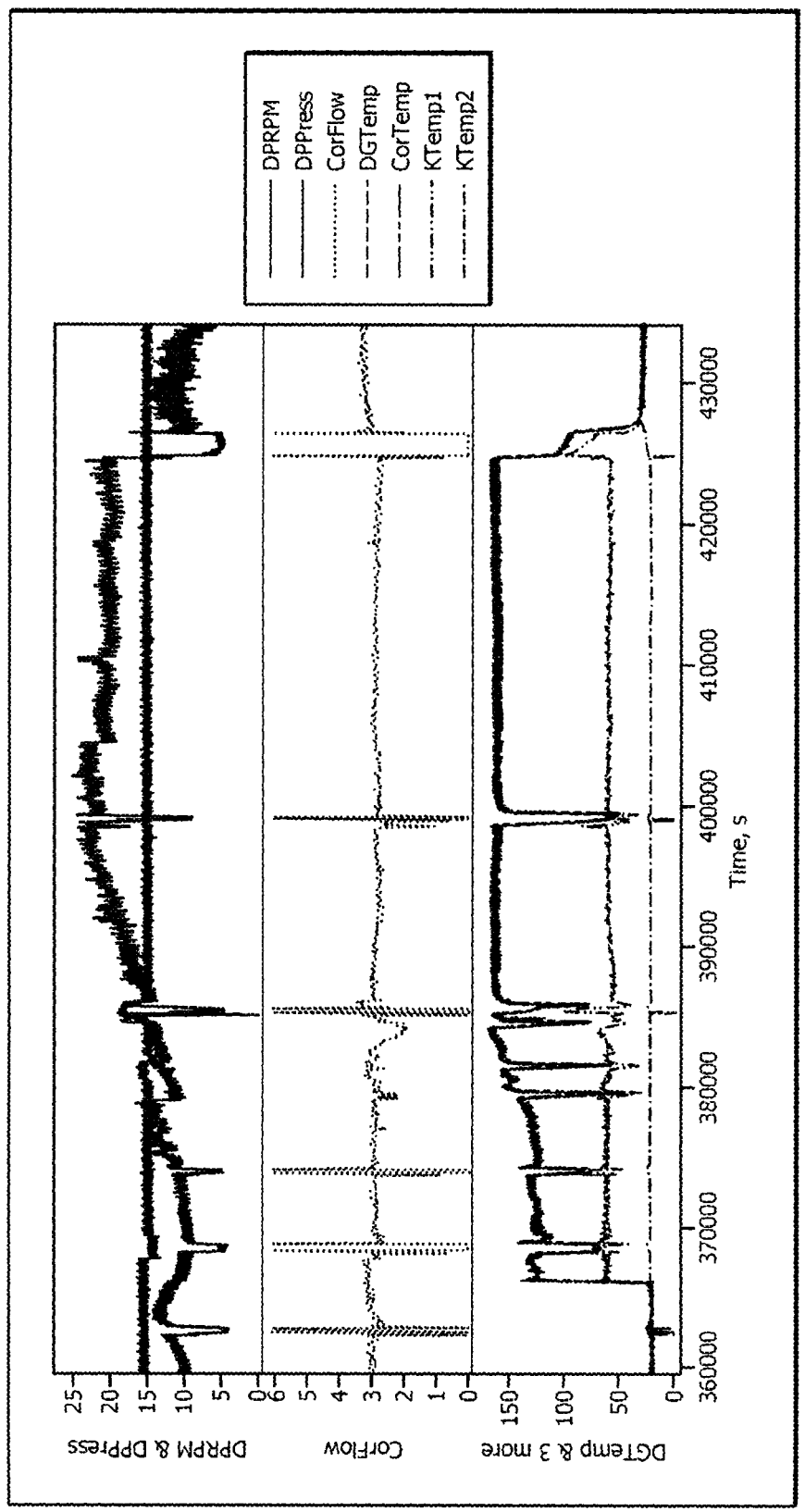
FIGS. 7B-7E are plots showing the results obtained via the Inventive runs of Example 4.
Figure 7C:
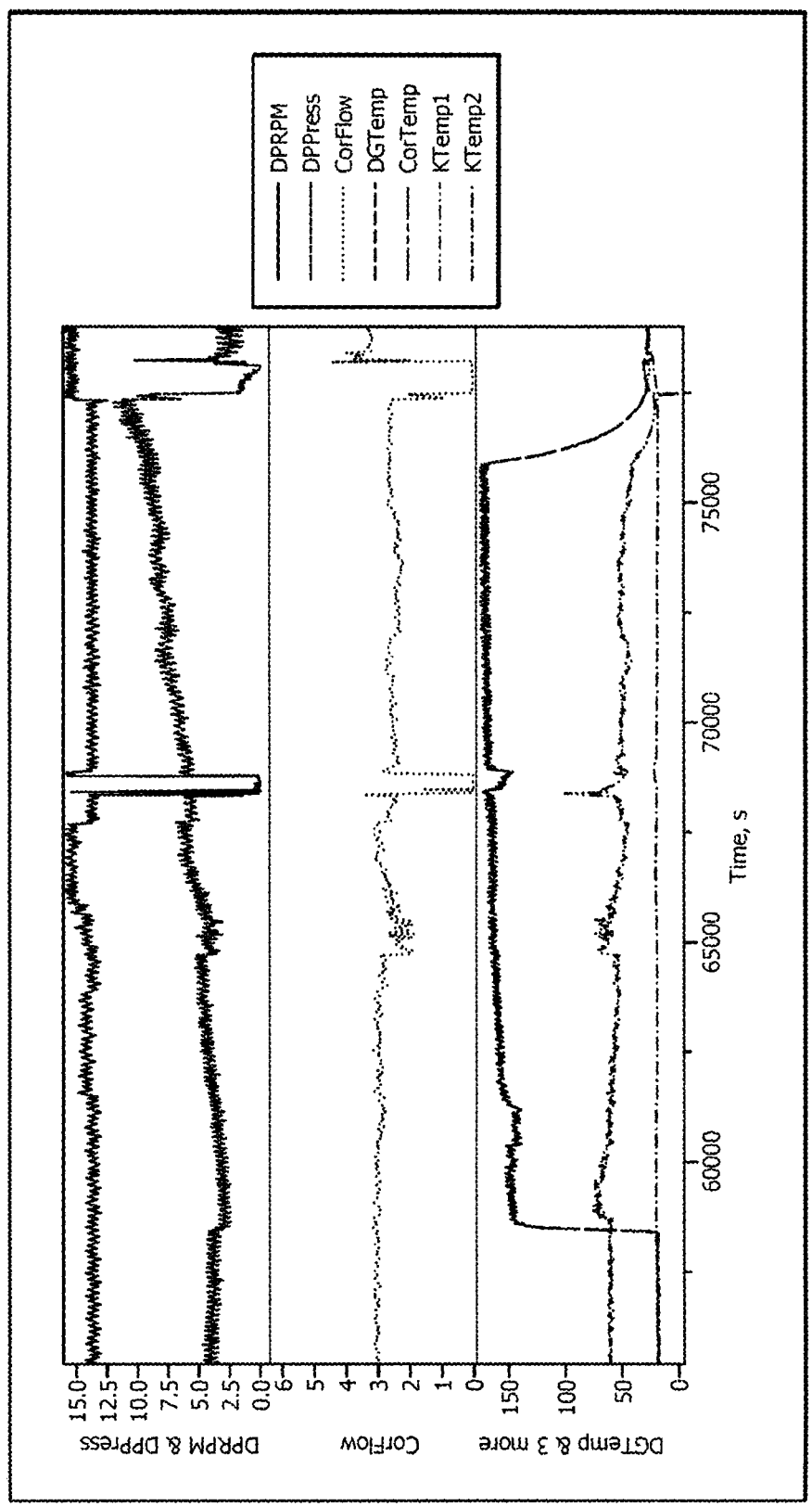
Figure 7D:
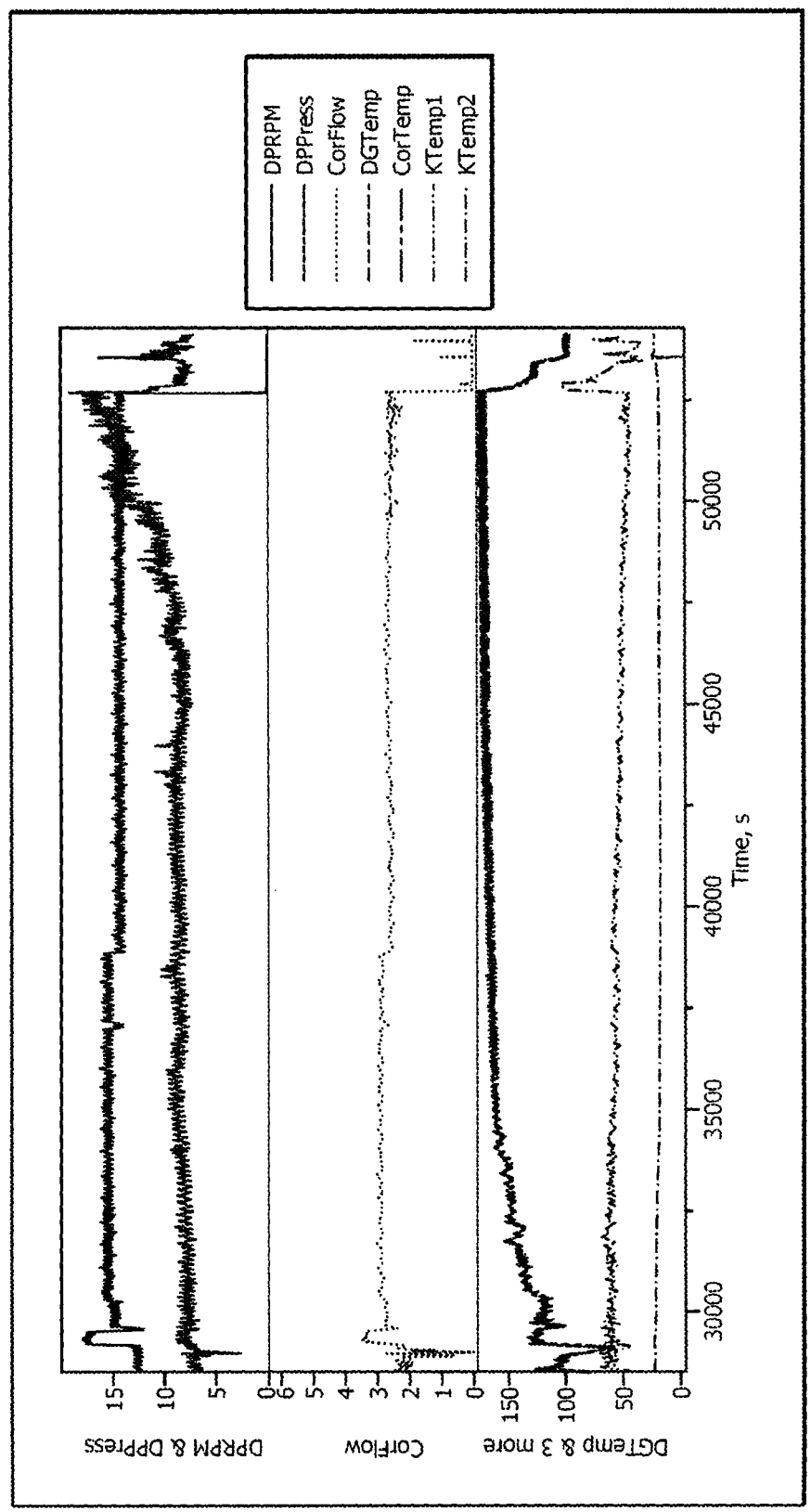
Figure 7E:
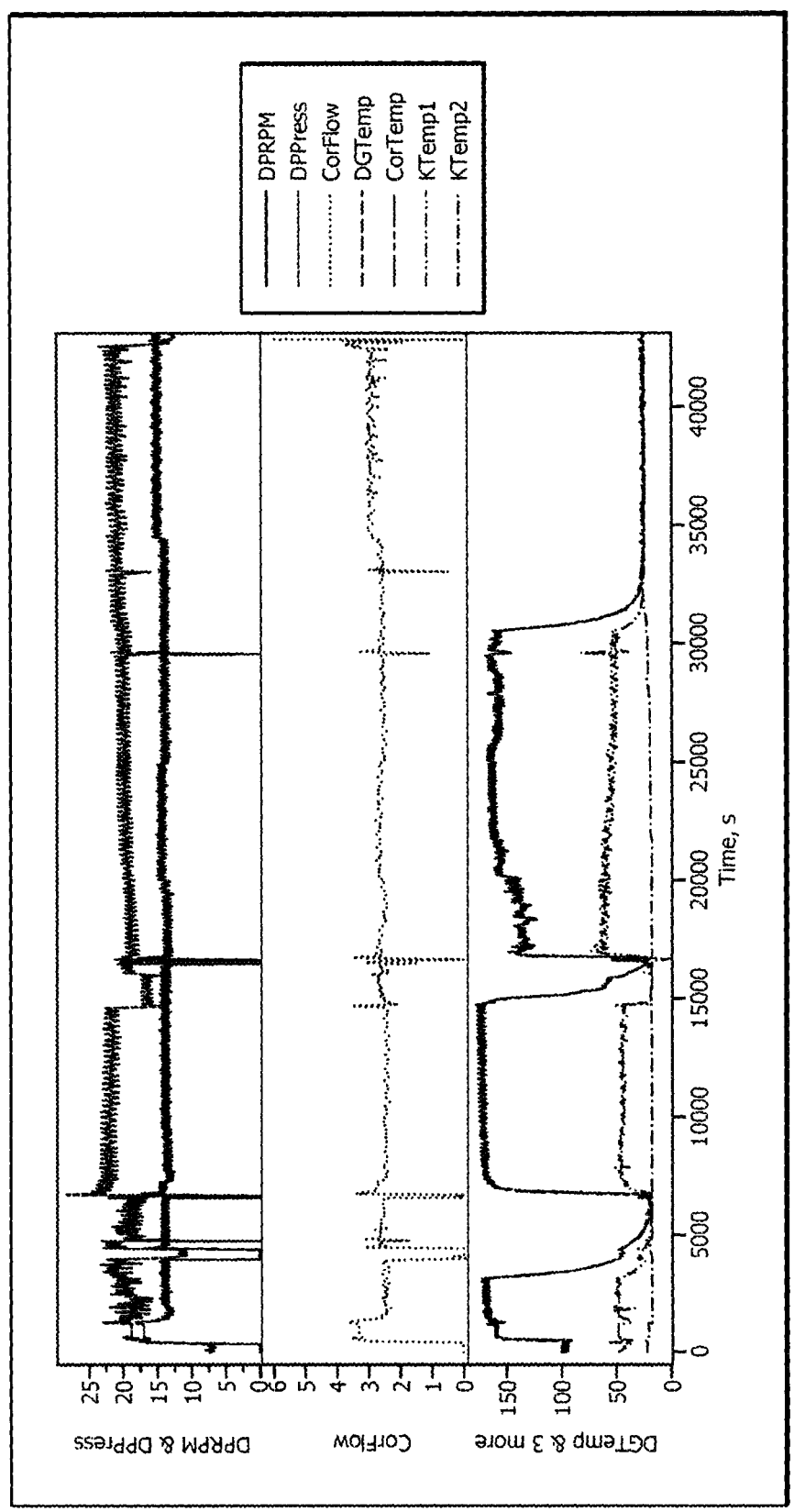

Experiments were conducted to further study the performance of a coated heater of this disclosure. FIG. 7A provides plots showing comparative results obtained using a conventional uncoated heater, while FIGS. 7B-7E are plots showing the results for runs utilizing the inventive coated heater of this disclosure.

Example 5

A summary of exemplary steps that were utilized to coat the coupons and heat exchange surface 55 in the EXAMPLES and that can be adapted for coating a heat exchange surface 55 of heater 50 (for testing of a composition and/or use) according to this disclosure is provided in Table 4.

TABLE 4

Exemplary Procedure for Coating Stainless Steel Plates and Heat Exchange Surface 55 of Heater 50

| Step No. | Procedure |
|---|---|
| 1 | Obtain number (e.g., eighteen in the Examples) 316 L stainless steel coupons with desired (e.g., 3" × 3" in the Examples) flat surface area |
| 2 | Treat surfaces as per coating composition (e.g., GENTOO ™ in the Examples) specifications |
| 3 | Apply coating composition to a test number (e.g., nine in the Examples) of coupons |
| 4 | Cure (e.g., 3 in the Examples) sets of (e.g., 3 in the Examples) coupons at various test temperatures (e.g., 120, 150, and 180 □C. in the Examples) for test time (e.g., manufacture stated time). |
| 5 | Cure (e.g., 3 in the Examples) sets of (e.g., 3 in the Examples) control coupons with no coating at test temperatures (e.g., 120, 150, and 180 □C. in the Examples) for test time (e.g., manufacture stated time). |
| 6 | Weigh all coupons |
| 7 | Add sample (e.g., 10 mL in the Examples) of test fluid (e.g., water based mud (WBM) in the Examples) to all coupons |
| 8 | Dry all coupons at drying temperature (e.g., 150 □C. in the Examples) for a minimum time (e.g., 6 hours in the Examples) to a maximum time (e.g., 12 hours in the Examples). All coupons can be dried for the same amount of time (as in the Examples). |
| 9 | Take pictures of all coupons |
| 10 | Weigh all coupons |
| 11 | Wash all coupons with clean water (e.g., at 0.1 to 0.3 m/s flow rate in the Examples) for a wash time (e.g., 5 minutes in the Examples) |
| 12 | Allow all coupons to dry |
| 13 | Take pictures of all coupons |
| 14 | Weigh all coupons |
| 15 | Analyze changes in weights and surface area coverages from test fluid (e.g., WBM in the Examples) |
| 16 | If success criteria is meet, repeat test with 1 set of control and experimental coupons with additional test fluid (e.g., oil based mud (OBM) in the Examples) |

Some of the steps can be repeated and/or absent, such as, for example and without limitation, no pictures may be taken as indicated at steps 9 and/or 13.

CONCLUSIONS FROM EXAMPLES

Example 1: GENTOO™ coating shows a significant ability to stop the adhesion of WBM onto stainless steel. The retained material (e.g., dried WBM) at curing temperatures 120 and 150° C. was not significantly different than zero amount retained based on standard deviation of test result. At 180° C., there was retention of drilling fluid (WBM) of approximately 2%, which did not overlap zero. The untreated material retained approximately 28% of WBM.

Example 2: no impact from a coating a clean or dirty surface was observed. At all curing temperatures, the retained material was not significantly different than zero.

Example 3: no impact from coating a rough or polished stainless steel surface was observed, and the coated polished surface and the coated rough surface were both effective minimize an amount of dried water based mud retained thereof.

Example 4: the coated heater of Example 4 provided for improved resistance to fouling due to the evaporation of the drilling fluid at the heater walls. This extended the life of the inventive heater by 300% between cleanings.

Additional Disclosure

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

Numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, RL, and an upper limit, RU, is disclosed, any number falling within the range is specifically disclosed. In particular, the following numbers within the range are specifically disclosed: $R=RL+k*(RU-RL)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed.

The following are nonlimiting, specific embodiments in accordance with the present disclosure:

Embodiment A: A gas extraction system comprising: a heater configured to receive a wellbore servicing fluid sample and discharge a heated wellbore servicing fluid sample, wherein the heater comprises an internal heat exchange surface coated with a superhydrophobic coating composition; a gas extractor configured to receive at least a portion of the heated wellbore servicing fluid sample and extract an extracted gas from the heated wellbore servicing fluid sample; and one or more detectors configured to receive at least a portion of the extracted gas and provide an analysis of the extracted gas.

Embodiment B: A method of retrofitting a gas extraction system, the gas extraction system comprising: a heater configured to receive a wellbore servicing fluid sample and discharge a heated wellbore servicing fluid sample; a gas extractor configured to receive at least a portion of the heated wellbore servicing fluid sample and extract an extracted gas from the heated wellbore servicing fluid sample; and one or more detectors configured to receive at least a portion of the extracted gas and provide an analysis of the extracted gas; and the method comprising coating an heat exchange surface of the heater with a superhydrophobic coating composition.

Embodiment C: A method comprising coating a heat exchange surface of a heater with a superhydrophobic coating.

Embodiment D: A method of surface data logging comprising: pumping a wellbore servicing fluid downhole through an internal flow bore of a tubular positioned in the wellbore, out an end of the tubular, and back uphole via an annulus located between the tubular and wellbore wall; recovering the wellbore servicing fluid from the wellbore at the surface to yield recovered wellbore servicing fluid; sampling the recovered wellbore servicing fluid to yield sampled wellbore servicing fluid; heating at least a portion of the sampled wellbore servicing fluid to yield heated wellbore servicing fluid, wherein the sampled wellbore servicing fluid is heated via contact with a heat exchange surface coated with a superhydrophobic coating composition; extracting gas from the heated wellbore servicing fluid to yield extracted gas; and analyzing at least a portion of the extracted gas.

Each of embodiments A, B, C, and D may have one or more of the following additional elements: Element 1: wherein the wellbore servicing fluid is a drilling fluid. Element 2: wherein the drilling fluid is a water based drilling fluid. Element 3: wherein the water based drilling fluid further comprises a polymeric emulsifier, a viscosifier, or both. Element 4: wherein the superhydrophobic coating composition comprises an acid catalyzed condensation reaction product comprised of: an organic polymeric silane selected from the group consisting of polycaprolactone polyols having 2 to 4 hydroxyl groups reacted with an isocyanate-terminated silane and polyurea silanes; an inorganic metal alkoxide; and a fluorinated silane. Element 5: wherein the polycaprolactone polyol has a molecular weight between 50 and 10,000 g/mol. Element 6: wherein the polyurea silane is a reaction product of an amine having at least two primary or secondary amine groups with an isocyanate-terminated silane. Element 7: wherein the polyurea silane is reaction product of diethylenetriamine with an isocyanate-terminated silane. Element 8: wherein metal alkoxide comprises at least one hydrolyzable compound having at least one silane group represented by the formula $Si(R1)_x(R2)_{4-x}$ per molecule, wherein R1 represents a C1-C8 alkyl group, an epoxide group, a vinyl group, an acrylic group, R2 represents a hydrolyzable alkoxy group or halide group, and x is 0, 1, 2 or 3. Element 9: wherein the fluorinated silane is a compound having the formula RflSi $(R1)_x(R2)_{3-x}$ where Rfl represents a fully or partially perfluorinated segment, R1 represents an alkyl group, represents a hydrolyzable alkoxy group or halide group, and x is 0, 1 or 2. Element 10: wherein the fluorinated silane is a bis-silane terminated polyfluoropolyether or a fluoro-terminated silane. Element 11: wherein the fluorinated silane is (3,3,3-trifluoropropyl)trimethoxysilane or nonafluorohexyltrimethoxysilane. Element 12: wherein the organic polymeric silane and the inorganic metal alkoxide are present in a weight ratio of between 1:10 to 10:1. Element 13: wherein the fluorinated silane is present in an amount between 0.0001 to 1 wt %. Element 14: wherein the superhydrophobic coating composition comprises GENTOO™ coating available from Ultratech International, Inc. Element 15: wherein the heat exchange surface coated with a superhydrophobic coating composition comprises steel or stainless steel. Element 16: wherein the heat exchange surface retains less than 25, 20, 15, 10, 9, 8, 7, 6, 5, 4, 3, 2, or 1 weight percent of water based drilling fluid contacted with the heat exchange surface at a temperature of 150° C. for a time period of equal to or greater than 1, 1.5, 2, 2.5, 3, 3.5, 4, 4.5, or 5 hours. Element 17: wherein less than 25, 20, 15, 10, 9, 8, 7, 6, 5, 4, 3, 2, or 1 percent of the surface area of the heat exchange surface retains residue of a water based drilling mud contacted with the heat exchange surface at a temperature of 150° C. for a time period of equal to or greater than 1, 1.5, 2, 2.5, 3, 3.5, 4, 4.5, or 5 hours following cleaning of the heat exchange surface via tap water and weak acid. Element 18: wherein the superhydrophobic coating has a contact angle for water droplets of equal to or greater than 140°, 145°, or 150°. Element 19: wherein the superhydrophobic coating displays a lotus effect upon contact by a drop of water. Element 20: wherein the coating is applied in situ to an internal heat exchange surface of the heater. Element 21: wherein the coating is applied by flowing a liquid coating composition into a fluid flow passage of the heater comprising the internal heat exchange surface, optionally removing any excess liquid coating composition, and curing the liquid coating composition to become a solid coating. Element 22: wherein the coating is cured at a temperature of less than 180, 175, 170, 165, 160, or 165 degrees Celsius (° C.) for a period of time from 5 minutes to 12 hours, alternatively from 30 minutes to 12 hours, or alternatively from 1 hour to 12 hours. Element 23: wherein the coating is cured at a temperature in a range of from 100 to 155° C., alternatively in a range of from 115 to 155° C., alternatively in a range of from 125 to 155° C., or alternatively from 130 to 150° C., for a period of time from 5 minutes to 12 hours, alternatively from 30 minutes to 12 hours, or alternatively from 1 hour to 12 hours.

What is claimed is:

1. A gas extraction system comprising:
   a heater configured to receive a wellbore servicing fluid sample and discharge a heated wellbore servicing fluid sample, wherein the heater is an electrical heater comprising a coiled tubing heat exchange surface providing therein a wellbore servicing fluid flow path, wherein an interior of the coiled tubing heat exchange surface is configured for contact with the wellbore servicing fluid, and wherein the interior of the coiled tubing heat exchange surface is coated with a superhydrophobic coating composition;
   a gas extractor configured to receive at least a portion of the heated wellbore servicing fluid sample and extract an extracted gas from the heated wellbore servicing fluid sample; and
   one or more detectors configured to receive at least a portion of the extracted gas and provide an analysis of the extracted gas.

2. The system of claim 1, wherein the wellbore servicing fluid is a drilling fluid.

3. The system of claim 2, wherein the drilling fluid is a water based drilling fluid.

4. The system of claim 3, wherein the water based drilling fluid further comprises a polymeric emulsifier, a viscosifier, or both.

5. The system of claim 1, wherein the superhydrophobic coating composition comprises an acid catalyzed condensation reaction product comprised of: an organic polymeric silane selected from the group consisting of polycaprolactone polyols having 2 to 4 hydroxyl groups reacted with an isocyanate-terminated silane and polyurea silanes; an inorganic metal alkoxide; and a fluorinated silane.

6. The system of claim 5, wherein the polycaprolactone polyol has a molecular weight between 50 and 10,000 g/mol.

7. The system of claim 5, wherein the polyurea silane is a reaction product of an amine having at least two primary or secondary amine groups with an isocyanate-terminated silane.

8. The system of any of claim 5, wherein metal alkoxide comprises at least one hydrolyzable compound having at least one silane group represented by the formula $Si(R1)_x(R2)_{4-x}$ per molecule, wherein R1 represents a C1-C8 alkyl group, an epoxide group, a vinyl group, an acrylic group, R2 represents a hydrolyzable alkoxy group or halide group, and x is 0, 1, 2 or 3.

9. The system of claim 5, wherein the fluorinated silane is a compound having the formula Rfl $Si(R1)_x(R2)_{3-x}$ where Rfl represents a fully or partially perfluorinated segment, R1 represents an alkyl group, represents a hydrolyzable alkoxy group or halide group, and x is 0, 1 or 2.

10. A method of retrofitting a gas extraction system, the gas extraction system comprising:
    a heater configured to receive a wellbore servicing fluid sample and discharge a heated wellbore servicing fluid sample;
    a gas extractor configured to receive at least a portion of the heated wellbore servicing fluid sample and extract an extracted gas from the heated wellbore servicing fluid sample; and
    one or more detectors configured to receive at least a portion of the extracted gas and provide an analysis of the extracted gas; and
    the method comprising coating a coiled tubing heat exchange surface of the heater with a superhydrophobic coating composition, wherein the heater is an electrical heater comprising the coiled tubing heat exchange surface, wherein the coiled tubing heat exchange surface provides therein a wellbore servicing fluid flow passage, wherein an interior of the coiled tubing heat exchange surface is configured for contact with the wellbore servicing fluid, wherein the interior of the coiled tubing heat exchange surface is coated with the superhydrophobic coating composition.

11. The method of claim 10, wherein the coating is applied in situ to the interior of the coiled tubing heat exchange surface of the heater.

12. The method of claim 11, wherein the coating is applied by flowing a liquid coating composition into the fluid flow passage of the heater comprising the interior of the coiled tubing heat exchange surface, removing any excess liquid coating composition, and curing the liquid coating composition to become a solid coating.

13. The method of claim 12 wherein the coating is cured at a temperature of less than or equal to 180 degrees Celsius for a period of time from 5 minutes to 12 hours.

14. The method of claim 12, wherein the coating is cured at a temperature in a range of from 100 to 155 degrees Celsius, for a period of time from 5 minutes to 12 hours.

15. A method of surface data logging comprising:
pumping a wellbore servicing fluid downhole through an internal flow bore of a tubular positioned in the wellbore, out an end of the tubular, and back uphole via an annulus located between the tubular and wellbore wall;
recovering the wellbore servicing fluid from the wellbore at the surface to yield recovered wellbore servicing fluid;
sampling the recovered wellbore servicing fluid to yield sampled wellbore servicing fluid;
heating at least a portion of the sampled wellbore servicing fluid to yield heated wellbore servicing fluid, wherein the sampled wellbore servicing fluid is heated via contact with a heat exchange surface coated with a superhydrophobic coating composition, wherein the heat exchange surface is a coiled tubing of an electrical heater comprising the coiled tubing heat exchange surface, wherein the coiled tubing heat exchange surface provides therein a wellbore servicing fluid flow passage, wherein an interior of the coiled tubing heat exchange surface is configured for contact with the wellbore servicing fluid, and wherein the interior of the coiled tubing heat exchange surface is the heat exchange surface coated with the superhydrophobic coating composition;
extracting gas from the heated wellbore servicing fluid to yield extracted gas; and
analyzing at least a portion of the extracted gas.

16. The method of claim 15, wherein the interior of the coiled tubing heat exchange surface coated with the superhydrophobic coating composition comprises steel or stainless steel.

17. The method of claim 16, wherein the interior of the coiled tubing heat exchange surface coated with the superhydrophobic coating composition retains less than 25 weight percent of water based drilling fluid contacted with the interior of the coiled tubing heat exchange surface at a temperature of 150 degrees Celsius for a time period of greater than or equal to 1 hour.

18. The method of claim 16, wherein less than 25 percent of the surface area of the interior of the coiled tubing heat exchange surface retains residue of a water based drilling mud contacted with the interior of the coiled tubing heat exchange surface at a temperature of 150 degrees Celsius for a time period of equal to or greater than 1 hour following cleaning of the interior of the coiled tubing heat exchange surface via tap water and weak acid.

19. The method of claim 15, wherein the superhydrophobic coating has a contact angle for water droplets of greater than or equal to 140 degrees.

20. The method of claim 15, wherein the superhydrophobic coating displays a lotus effect upon contact by a drop of water.

* * * * *